(12) United States Patent
Nishioka et al.

(10) Patent No.: US 8,675,144 B2
(45) Date of Patent: Mar. 18, 2014

(54) TELEVISION AND ELECTRONIC APPARATUS

(75) Inventors: Hisaya Nishioka, Hamura (JP); Yuichi Koga, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/525,838

(22) Filed: Jun. 18, 2012

(65) Prior Publication Data

US 2013/0057775 A1 Mar. 7, 2013

(30) Foreign Application Priority Data

Sep. 1, 2011 (JP) ................................. 2011-190673

(51) Int. Cl.
*H04N 5/64* (2006.01)
*H04N 7/00* (2011.01)

(52) U.S. Cl.
USPC ............ 348/844; 348/838; 348/843; 348/836

(58) Field of Classification Search
USPC .................................. 348/836, 838, 843, 844
See application file for complete search history.

(56) References Cited

U.S. PATENT DOCUMENTS

| 7,855,874 B2 | 12/2010 | Nakajima et al. |
| 2006/0210869 A1 | 9/2006 | Takeguchi et al. |
| 2006/0234118 A1 | 10/2006 | Nakajima et al. |

FOREIGN PATENT DOCUMENTS

| JP | 2002-110115 A | 4/2002 |
| JP | 2002-260621 | 9/2002 |
| JP | 2003-323876 A | 11/2003 |
| JP | 2004-356027 A | 12/2004 |
| JP | 2006-260973 | 9/2006 |
| JP | 2006-302572 | 11/2006 |
| JP | 2008-192447 A | 8/2008 |
| JP | 2010-277692 A | 12/2010 |

OTHER PUBLICATIONS

First Office Action mailed by Japan Patent Office on Oct. 16, 2012 in the corresponding to Japanese patent application No. 2011-190673.

*Primary Examiner* — Geepy Pe
(74) *Attorney, Agent, or Firm* — Knobbe, Martens, Olson & Bear LLP

(57) ABSTRACT

According to at least one embodiment, an electronic apparatus, such as a television, includes a housing, battery cells in the housing, and a supporting portion between the battery cells. The supporting portion is thicker than one of the battery cells. The electronic apparatus can also include case including a base and a cover.

18 Claims, 19 Drawing Sheets

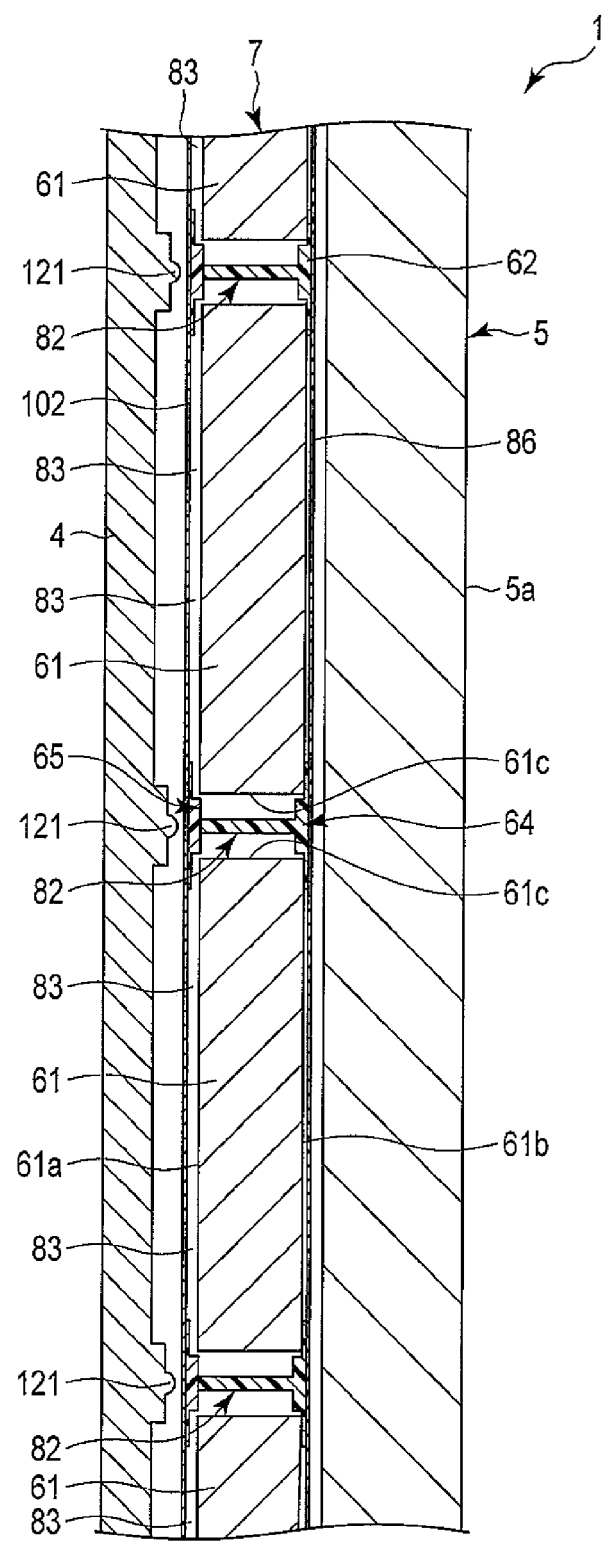
F I G. 3

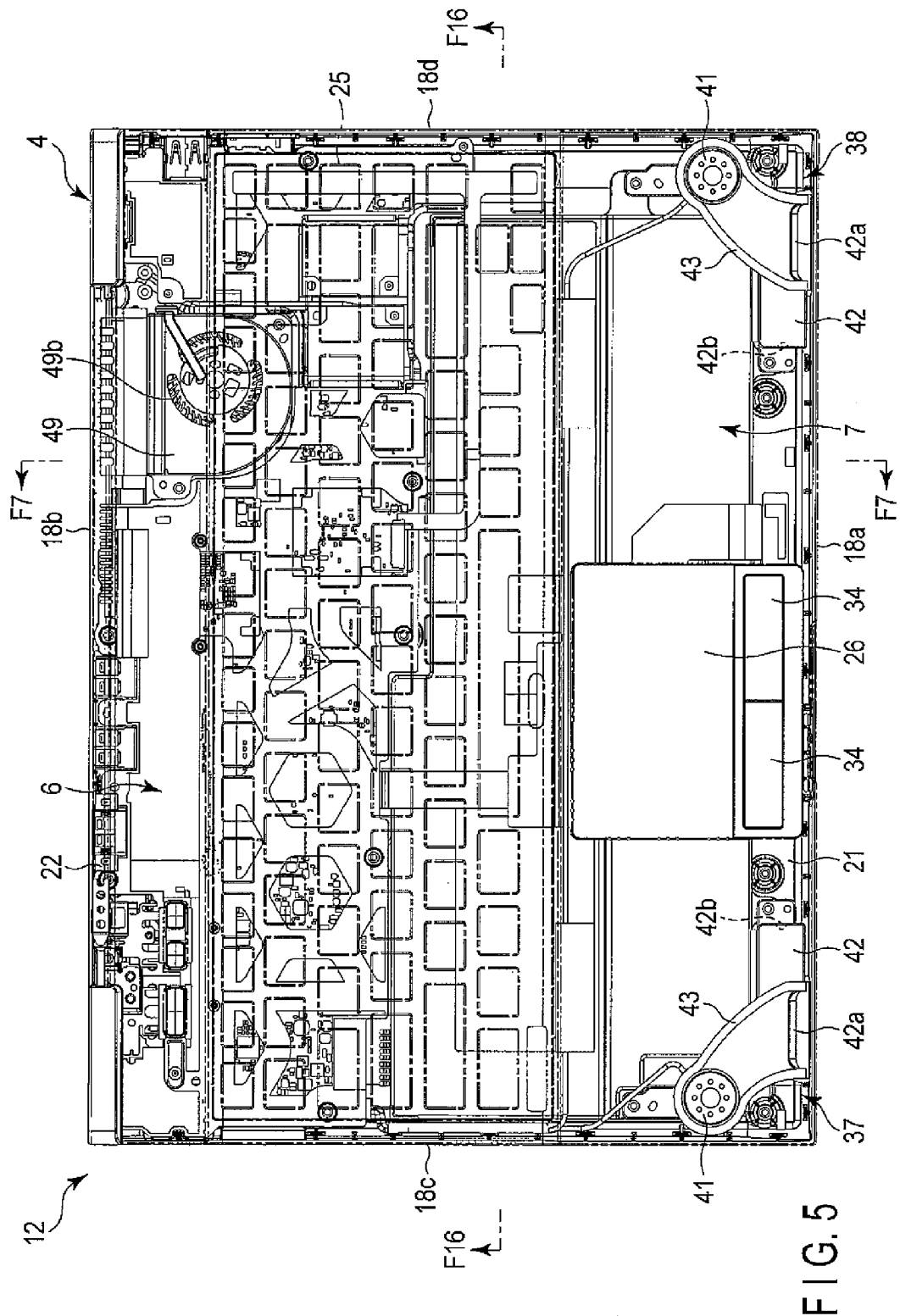
F I G. 5

TELEVISION AND ELECTRONIC APPARATUS

CROSS-REFERENCE TO RELATED APPLICATIONS

This application is based upon and claims the benefit of priority from Japanese Patent Application No. 2011-190673, filed Sep. 1, 2011, the entire contents of which are incorporated herein by reference.

FIELD

Embodiments described herein relate generally to electronic apparatuses including televisions.

BACKGROUND

An electronic apparatus having a battery mounted thereon is provided.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary cross-sectional view of the television shown in FIG. 1.

FIG. 5 is an exemplary plan view illustrating an inner part of a first unit shown in FIG. 4.

DETAILED DESCRIPTION

Various embodiments will be described hereinafter with reference to the accompanying drawings.

In general, according to one embodiment, an electronic apparatus comprises a housing, battery cells in the housing, and a supporting portion between the battery cells. The supporting portion is thicker than one of the battery cells.

Hereinafter, embodiments will be described with reference to the drawings.

First Embodiment

Figure 1:
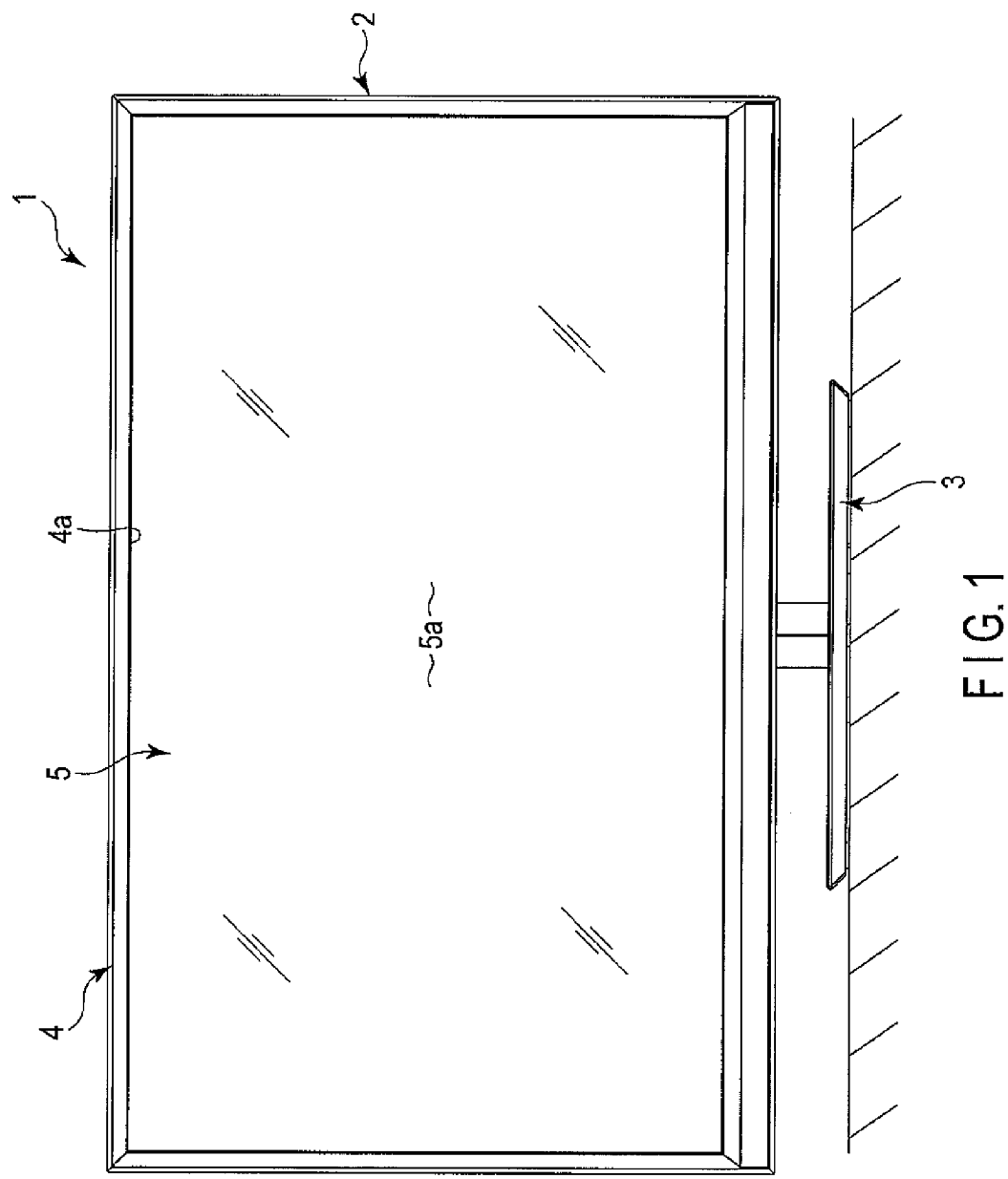
FIG. 1 is an exemplary front view of a television according to a first embodiment.
Figure 2:
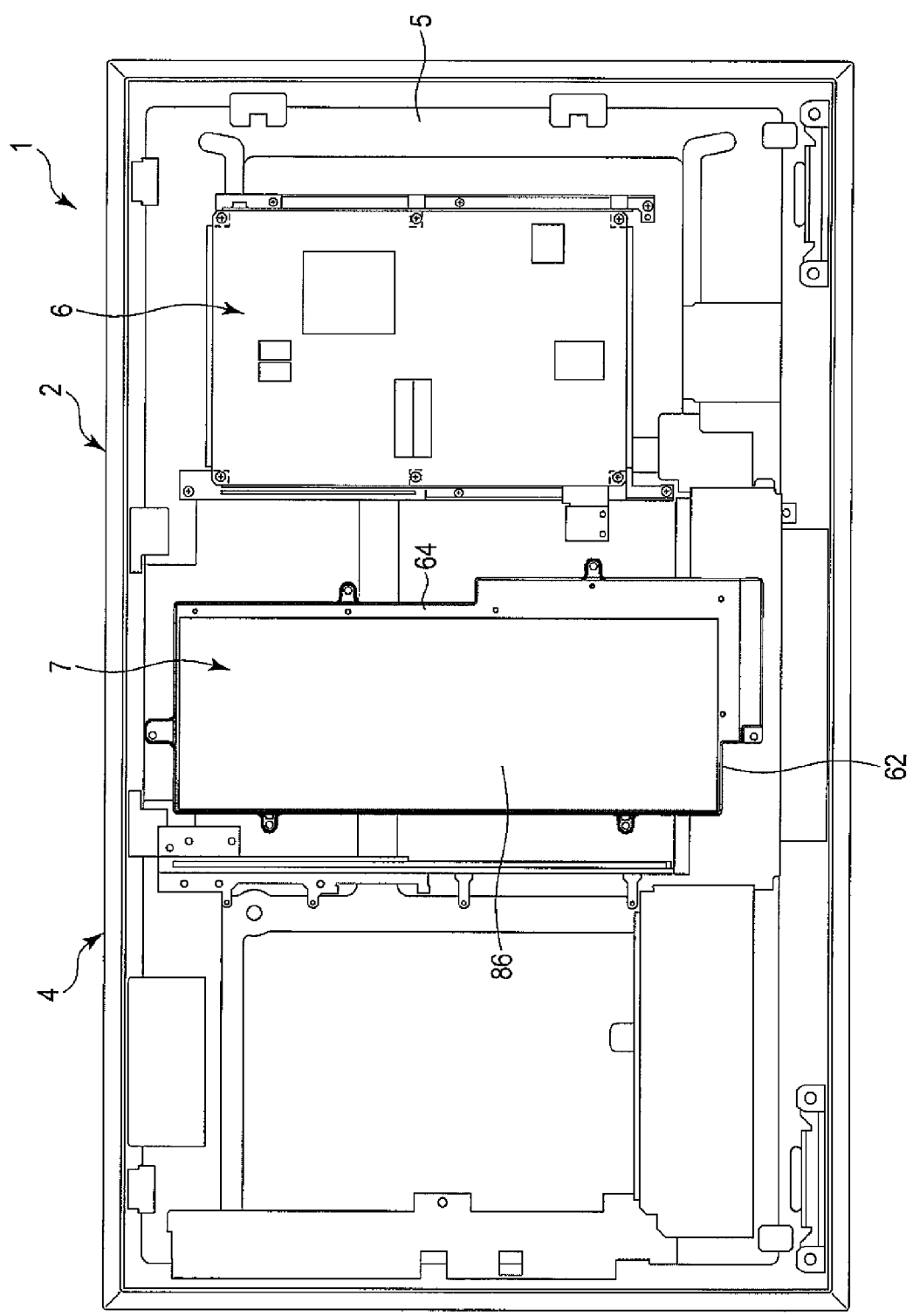
FIG. 2 is an exemplary rear view illustrating the inner part of the television shown in FIG. 1.

FIGS. 1 to 3 disclose a television 1 according to a first embodiment. The television 1 is an example of an "electronic apparatus." As shown in FIG. 1, the television 1 includes a display unit 2 and a stand 3 that supports the display unit 2.

The display unit 2 includes a housing 4 and a display device 5 accommodated in the housing 4. The display device 5 includes a display screen 5a. The housing 4 includes an opening portion 4a through which the display screen 5a is exposed.

As shown in FIG. 2, a circuit board 6 and a battery unit 7 are accommodated in the housing 4. The detailed configurations of the housing 4, the circuit board 6, and the battery unit 7 are the same as those of an electronic apparatus 11 according to a second embodiment. Therefore, the second embodiment will be described in detail representatively, and detailed description of the configurations of the housing 4, the circuit board 6, and the battery unit 7 in the present embodiment will not be provided. In FIGS. 1 to 3, configurations having the same or similar functions as the configurations of the second embodiment will be denoted by the same reference numerals.

Second Embodiment

Next, the electronic apparatus 11 according to the second embodiment will be described with reference to FIGS. 4 to 22. The electronic apparatus 11 is a notebook-type portable computer (notebook PC), for example. Electronic apparatuses to which the present embodiment can be applied are not limited to the above example. The present embodiment can be broadly applied to other electronic apparatuses such as, for example, a slate-type portable computer (slate PC), a mobile phone including a smart phone, or a game machine.

Figure 4:
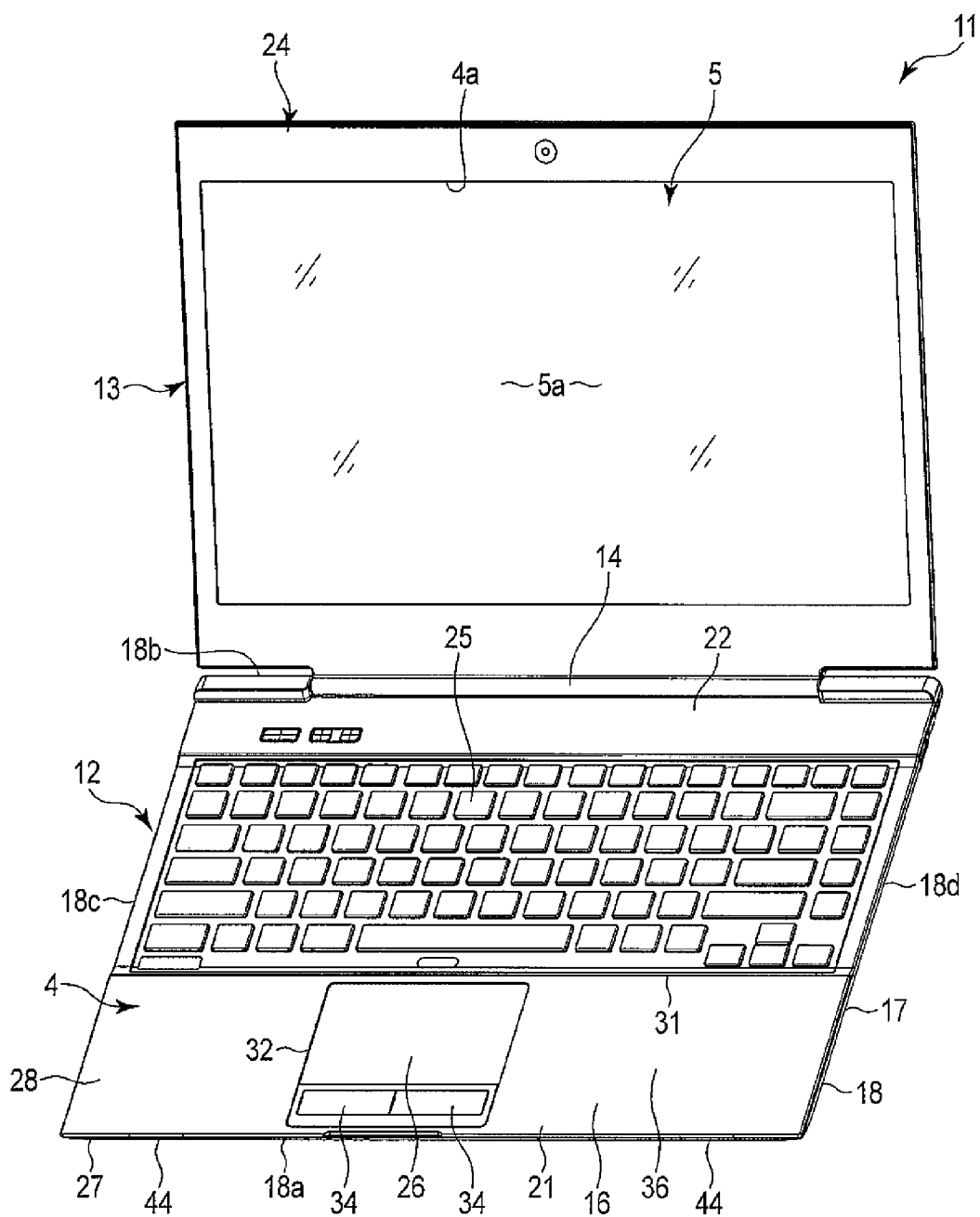
FIG. 4 is an exemplary perspective view of an electronic apparatus according to a second embodiment.

As shown in FIG. 4, the electronic apparatus 11 includes a first unit 12, a second unit 13, and a hinge portion 14. The first unit 12 is a main unit on which a main board, for example, is mounted. The first unit 12 includes a first housing 4. The first housing 4 is made of metal such as a magnesium alloy, for example, and has relatively high rigidity. The first housing 4 includes an upper wall 16, a lower wall 17, and a circumferential wall 18 and has a flat box-like shape.

The lower wall 17 faces a table surface (i.e., outer mounting surface) when the electronic apparatus 11 is placed on a table. The lower wall 17 includes a plurality of leg portions 19 (see FIGS. 7 and 11) that are in contact with the table surface, for example. The upper wall 16 is positioned on a side opposite to the lower wall 17. The upper wall 16 extends approximately in parallel to the lower wall 17 with a space between the lower wall 17 and the upper wall 16. The upper wall 16 is an example of a "first wall." The lower wall 17 is an example of a "second wall."

The circumferential wall 18 connects the peripheral portion of the lower wall 17 and the peripheral portion of the upper wall 16. Both or either one of the lower wall 17 and the upper wall 16 may be bent toward the circumferential wall 18 and connected to the circumferential wall 18 in an approximately circular arc shape.

The first housing 4 includes a first end portion 21 and a second end portion 22. The first end portion 21 is a front end portion, for example. The second end portion 22 is a rear end portion, for example, and is positioned on a side opposite to the first end portion 21. The circumferential wall 18 includes a front wall 18a, a rear wall 18b, a first side wall 18c (for example, a left side wall), and a second side wall 18d (for example, a right side wall).

The front wall 18a is positioned on the first end portion 21. The front wall 18a extends in the longitudinal direction of the housing 4 (e.g., the horizontal width direction of the housing 4). The rear wall 18b is positioned on the second end portion 22. The rear wall 18b extends approximately in parallel to the front wall 18a. The first side wall 18c and the second side wall 18d extend in a direction crossing (for example, approximately perpendicular to) the front wall 18a and the rear wall 18b. The first side wall 18c and the second side wall 18d extend in the lateral direction of the housing 4 (e.g., the depth direction of the housing 4). The first side wall 18c and the second side wall 18d connect the end portions of the front wall 18a and the end portions of the rear wall 18b, respectively.

As shown in FIG. 4, the second unit 13 is a display unit, for example, and includes a second housing 24 and a display device 5 accommodated in the second housing 24. The display device 5 is a liquid crystal display, for example, but is not limited to this. The display device 5 includes a display screen 5a on which images and videos are displayed. The second housing 24 includes an opening portion 4a through which the display screen 5a is exposed.

The second housing 24 is pivotably (i.e., openably and closably) connected to a second end portion 22 of the first housing 4 by the hinge portion 14. As a result, the second unit 13 can pivot between a first position where the first unit 12 and the second unit 13 are overlaid with each other and a second position where the first unit 12 and the second unit 13 are open relative to each other.

Next, a mounting structure of the electronic apparatus 11 will be described. In the following description, for the sake of convenience, the "first housing 4" will be simply referred to as "housing 4."

As shown in FIGS. 4 and 5, a keyboard 25 and a touch pad 26 are provided on the upper wall 16 of the housing 4. The keyboard 25 is an example of a "first input unit." The touch pad 26 is an example of a "second input unit." The first and second input units are not limited to the above examples but may be a touch panel (i.e., touch sensor) and other input devices.

As shown in FIG. 4, the housing 4 includes a lower cover 27 (i.e., base) and an upper cover 28 (i.e., cover). The lower cover 27 includes the lower wall 17 and a part of the circumferential wall 18. The upper cover 28 includes the upper wall 16 and a part of the circumferential wall 18. The lower cover 27 and the upper cover 28 are combined with each other to form the housing 4.

Figure 6:
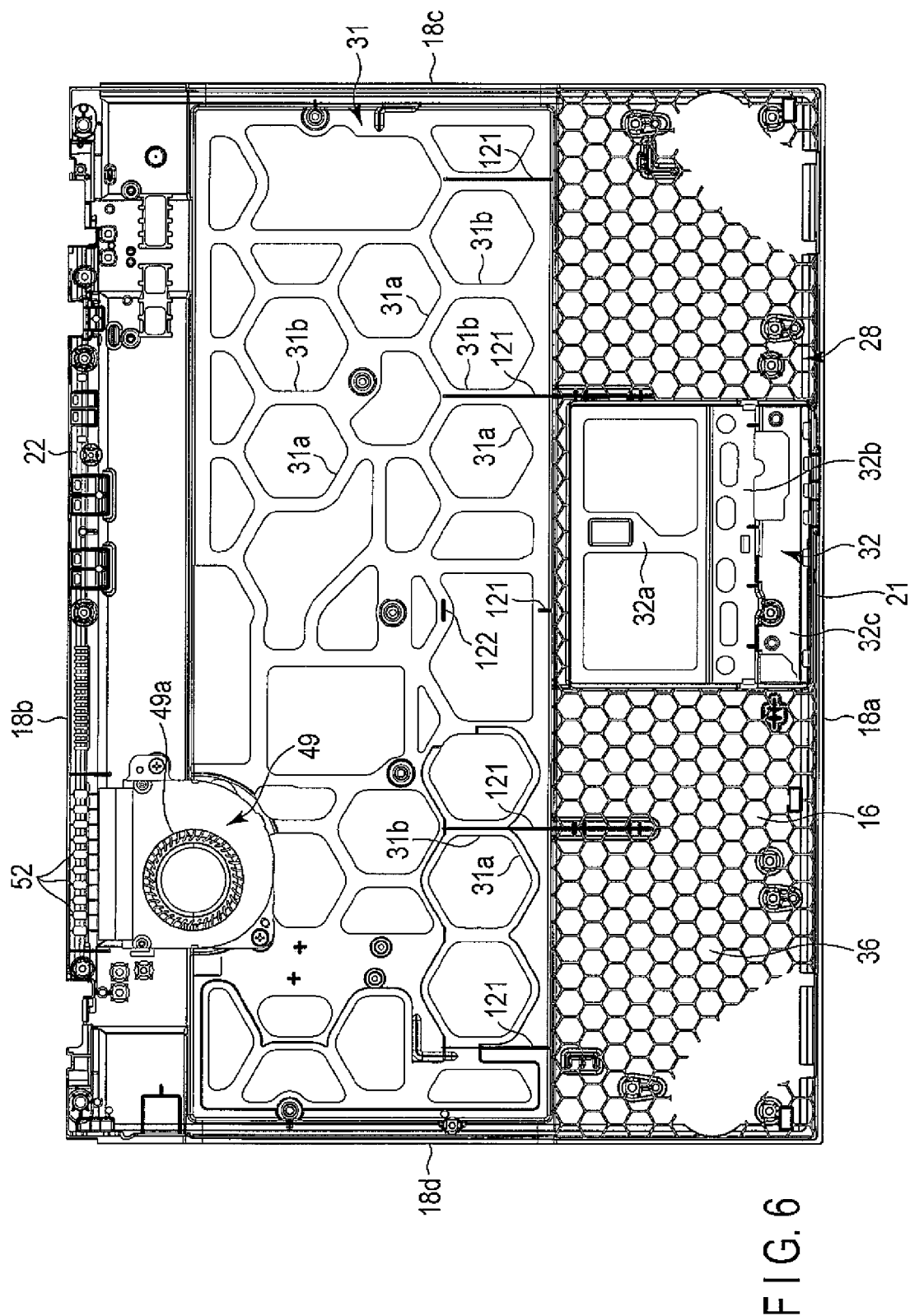
FIG. 6 is an exemplary plan view illustrating an inner surface of an upper cover shown in FIG. 4.

FIG. 6 illustrates the inner surface of the upper cover 28 by turning the upper cover 28 upside down. The upper cover 28 includes a keyboard attachment portion 31 to which the keyboard 25 is attached and a touch pad attachment portion 32 to which the touch pad 26 is attached. The keyboard attachment portion 31 is an example of a "first attachment portion." The touch pad attachment portion 32 is an example of a "second attachment portion."

Figure 7:
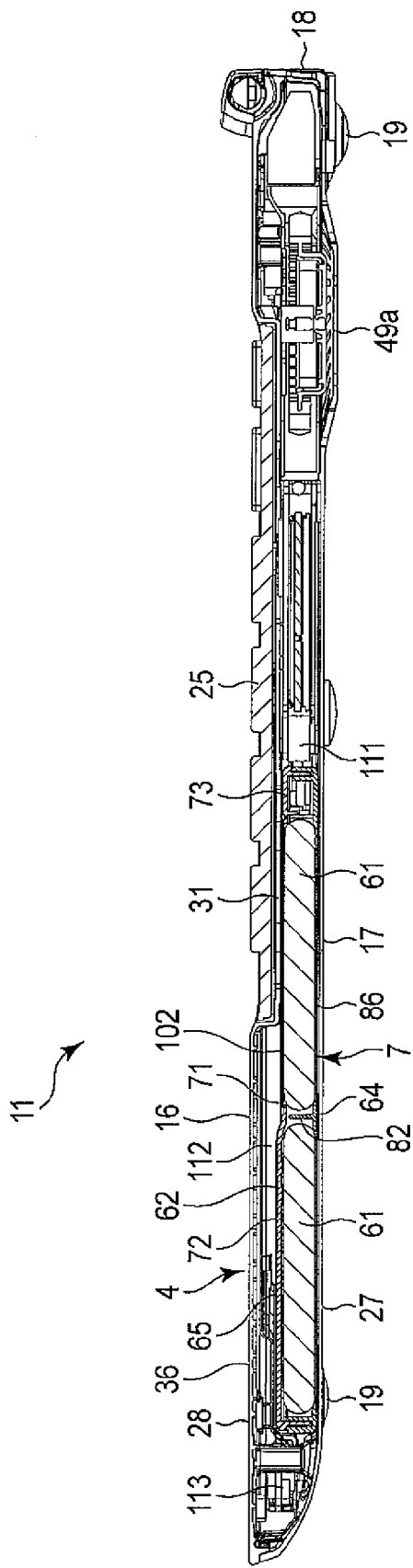
FIG. 7 is an exemplary cross-sectional view taken along the line F7-F7 of the first unit shown in FIG. 5.

The keyboard attachment portion 31 extends in the longitudinal direction of the housing 4 and covers approximately the entire width of the housing 4. As shown in FIG. 7, the keyboard attachment portion 31 is depressed from the upper wall 16 (e.g., palmrest 36). As a result, the keyboard 25 attached to the keyboard attachment portion 31 is approximately at the same height as the upper wall 16 (e.g., the palmrest 36) or is slightly higher than the upper wall 16 (e.g., the palmrest 36).

As shown in FIG. 6, the keyboard attachment portion 31 of the present embodiment has a honeycomb structure. That is, the keyboard attachment portion 31 includes a plurality of hexagonal openings 31a and a plurality of beams 31b (i.e., supporting portions) extending between the openings 31a. The plurality of beams 31b are connected to each other to form hexagonal frames. These beams 31b are formed approximately over the entire area of the keyboard attachment portion 31 so as to support the keyboard 25 from the lower side.

With such a honeycomb structure, the keyboard attachment portion 31 secures strength (i.e., rigidity) and realizes a light weight at the same time. As a result, the keyboard attachment portion 31 is rarely bent even when the user strikes the keyboard 25 strongly.

Figure 8:
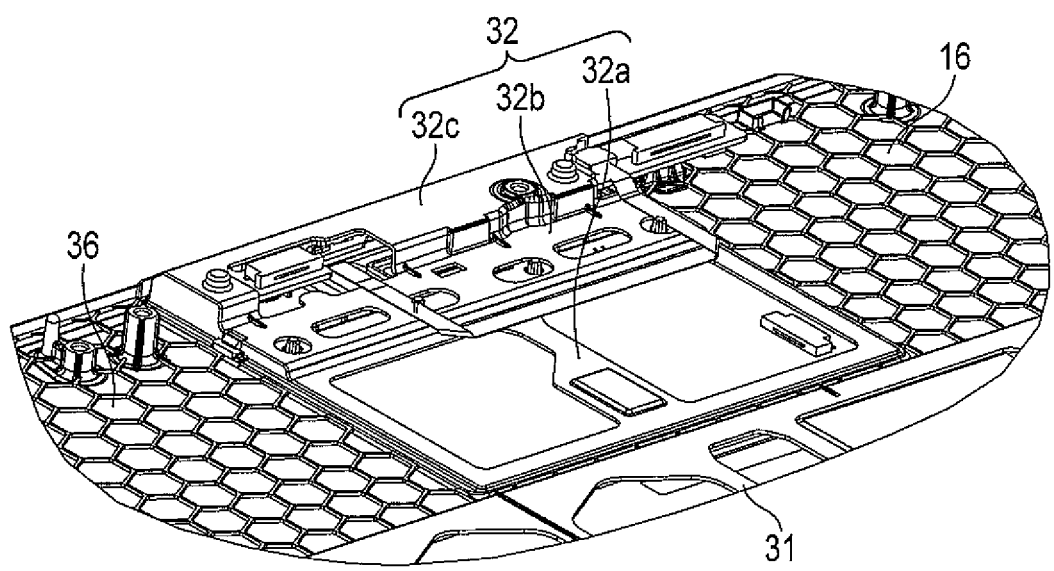
FIG. 8 is an exemplary perspective view of a touch pad attachment portion shown in FIG. 6.
Figure 20:
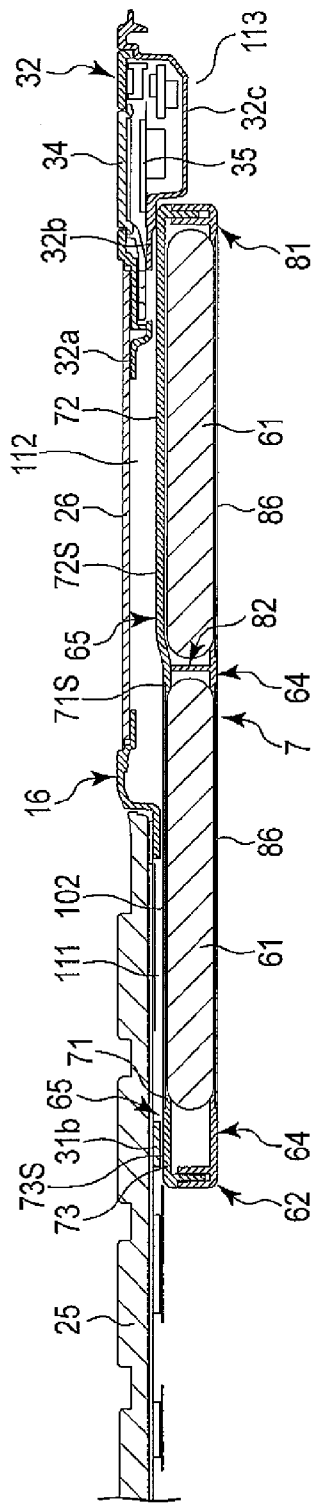
FIG. 20 is an exemplary cross-sectional view taken along the line F20-F20 of the keyboard and the battery unit shown in FIG. 16.

As shown in FIG. 6, the touch pad attachment portion 32 is positioned between the keyboard attachment portion 31 and the first end portion 21. As shown in FIGS. 8 and 20, the touch pad attachment portion 32 is depressed from the upper wall 16 (e.g., the palmrest 36). The touch pad attachment portion 32 supports the touch pad 26 from the inner side (that is, the lower side) of the housing 4.

As shown in FIGS. 8 and 20, the touch pad attachment portion 32 includes a first portion 32a, a second portion 32b, and a third portion 32c. The first portion 32a is adjacent to the keyboard attachment portion 31. The first portion 32a is depressed to be shallower than the keyboard attachment portion 31. A flat portion of the touch pad 26 is mounted on the first portion 32a.

The second portion 32b is positioned between the first portion 32a and the first end portion 21. The second portion 32b is deeper than the first portion 32a and is depressed to be shallower than the keyboard attachment portion 31. A component mounting portion of the touch pad 26 is mounted on the second portion 32b.

The third portion 32c is positioned between the second portion 32b and the first end portion 21. The third portion 32c is deeper than the second portion 32b and is depressed to be deeper than the keyboard attachment portion 31, for example. A button 34 (i.e., touch pad button) of the touch pad 26 and a switch 35 (i.e., switch board) operated by the button 34 are attached to the third portion 32c.

As shown in FIG. 4, the palmrest 36 is provided on both left and right sides of the touch pad attachment portion 32. The palmrest 36 extends between the keyboard attachment portion 31 and the first end portion 21. As shown in FIG. 6, honeycomb ribs (ribs formed by a honeycomb structure) are provided on the inner surface of the palmrest 36. As a result, the palmrest 36 is rarely bent even when it is strongly pressed by the user.

Figure 9:
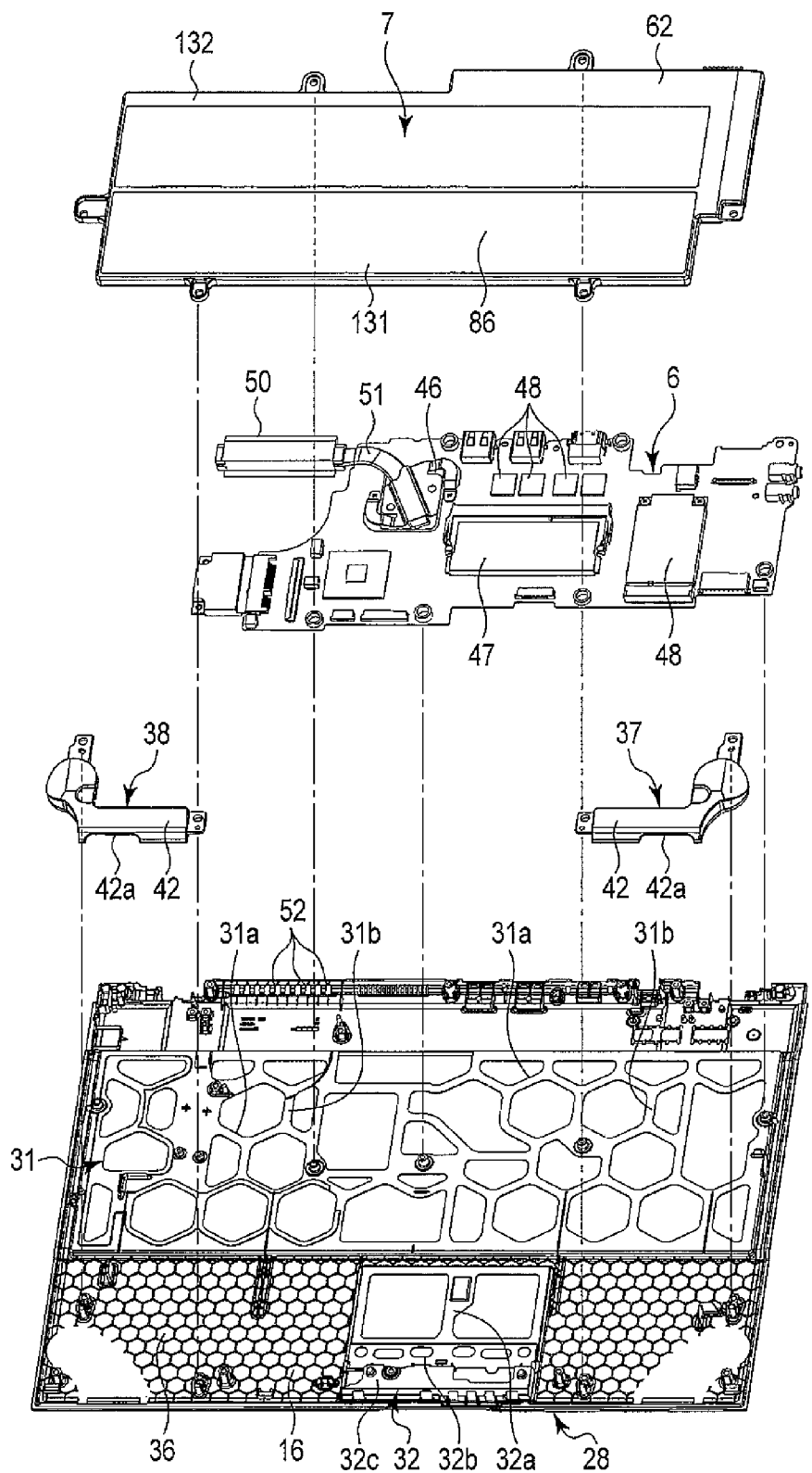
FIG. 9 is an exemplary exploded perspective view illustrating the inner part of the first unit shown in FIG. 5.
Figure 10:
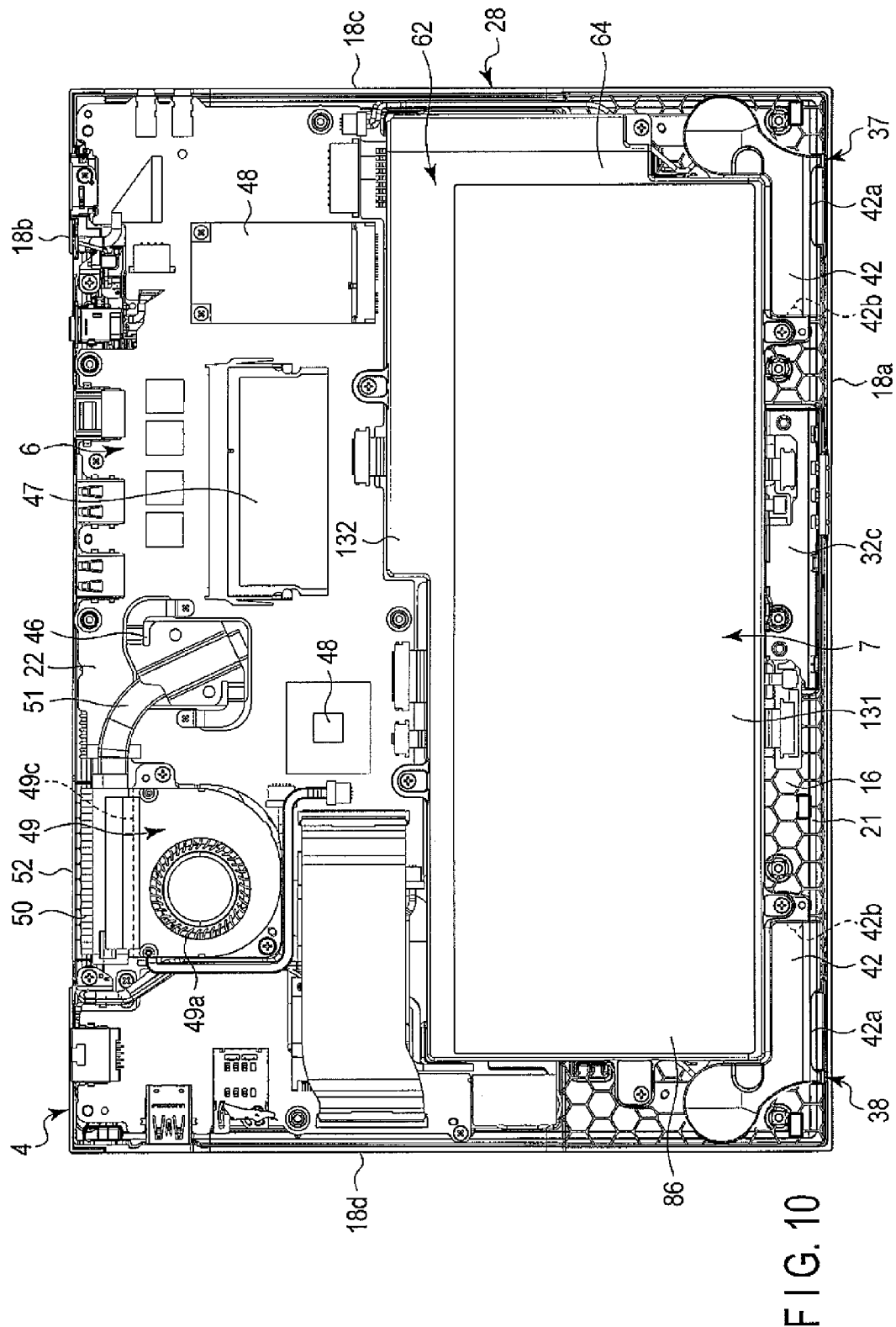
FIG. 10 is an exemplary bottom view illustrating the inner part of the first unit shown in FIG. 5.

As shown in FIGS. 9 and 10, a pair of speakers 37 and 38, a circuit board 6, and a battery unit 7 are accommodated in the housing 4. These speakers 37 and 38, the circuit board 6, and the battery unit 7 are attached (e.g., fixed) to the inner surface of the upper wall 16.

As shown in FIGS. 5 and 10, the pair of speakers 37 and 38 is disposed separately at the left and right end portions. The first speaker 37 extends along the first side wall 18c and the front wall 18a. The second speaker 38 extends along the second side wall 18d and the front wall 18a.

As shown in FIG. 5, the first speaker 37 includes a speaker 41 (i.e., speaker body) and a speaker box 42 in which the speaker 41 is accommodated. The speaker 41 has a relatively large diameter in order to realize high audio quality. The speaker 41 having a large diameter is mounted approximately in parallel to the palmrest 36 (i.e., the upper wall 16) in order to decrease the thickness of the housing 4. That is, the vibrating plate of the speaker 41 faces the inner surface of the palmrest 36 (i.e., the upper wall 16).

The speaker box 42 includes a first sound radiation hole 42a (i.e., first opening) and a second sound radiation hole 42b (i.e., second opening). The first sound radiation hole 42a radiates sound in the medium to high octave ranges. The first sound radiation hole 42a faces the front wall 18a of the housing 4. That is, the first sound radiation hole 42a is open in a direction crossing (for example, approximately perpendicular to) the vibrating direction of the speaker 41.

A guide 43 that guides sound from the speaker 41 toward the first sound radiation hole 42a is provided between the speaker 41 and the first sound radiation hole 42a. The guide 43 provides a sound conducting region (i.e., sound conducting space or sound conducting portion) between the speaker 41 and the first sound radiation hole 42a. The guide 43 is formed by a cushion (e.g., sponge), for example.

As shown in FIG. 4, the front wall 18a of the housing 4 includes an opening 44 that faces the first sound radiation hole 42a. The sound in the medium to high octave range from the first speaker 37 is radiated to the outside of the housing 4 from the opening 44 of the front wall 18a.

As shown in FIG. 10, the second sound radiation hole 42b is a so-called bass reflex hole and radiates sound in a low octave range (for example, several hundreds of Hz). The second sound radiation hole 42b is open to the inside of the housing 4 in the longitudinal direction of the housing 4. That is, sound in the low octave range is radiated to the inside of the housing 4. In the present embodiment, by utilizing the non-directional characteristics of the low octave range, sound in the low octave range is resonated using the inner space of the housing 4. As a result, sound in the low octave range is enhanced.

As shown in FIG. 10, the speaker box 42 extends along the front wall 18a. The second sound radiation hole 42b is formed in an end portion of the speaker box 42 and radiates low-octave sound toward the second side wall 18d. The low-octave sound radiated from the second sound radiation hole 42b is transmitted to the outside by passing through small holes of the housing 4 (for example, the touch pad attachment portion 32 or screw holes) or vibrating the product itself.

Since the second speaker 38 has approximately the same configuration as the first speaker 37, configurations having the same functions will be denoted by the same reference numerals and the description thereof will not be provided.

The second speaker 38 includes the speaker 41 and the speaker box 42 in which the speaker 41 is accommodated.

As shown in FIG. 10, the speaker box 42 of the second speaker 38 also extends along the front wall 18a. The second sound radiation hole 42b of the second speaker 38 is provided in an end portion of the speaker box 42 and radiates low-octave sound toward the first side wall 18c. Here, the second sound radiation hole 42b of the first speaker 37 and the second sound radiation hole 42b of the second speaker 38 face each other. As a result, the low-octave sound from the first speaker 37 and the low-octave sound from the second speaker 38 are combined and enhanced inside the housing 4 and transmitted to the outside.

As shown in FIG. 10, the circuit board 6 is provided in the vicinity of the second end portion 22 of the housing 4. The circuit board 6 has a rectangular shape. The longitudinal direction of the circuit board 6 extends in the longitudinal direction of the housing 4. The circuit board 6 is a main board, for example.

A heat-generating component 46, a memory 47, and various electronic components 48 are mounted on the circuit board 6. The heat-generating component 46 is a central processing unit (CPU), for example, but is not limited to this. The heat-generating component 46 may be a graphic chip or other components, or may be various components in which it is desirable to dissipate heat therefrom.

A fan 49, a heat sink 50, and a heat pipe 51 are accommodated in the housing 4. Ventilation holes 52 (i.e., openings) are formed on the rear wall 18b of the housing 4. The heat sink 50 faces the ventilation holes 52. The fan 49 faces the heat sink 50.

Figure 11:
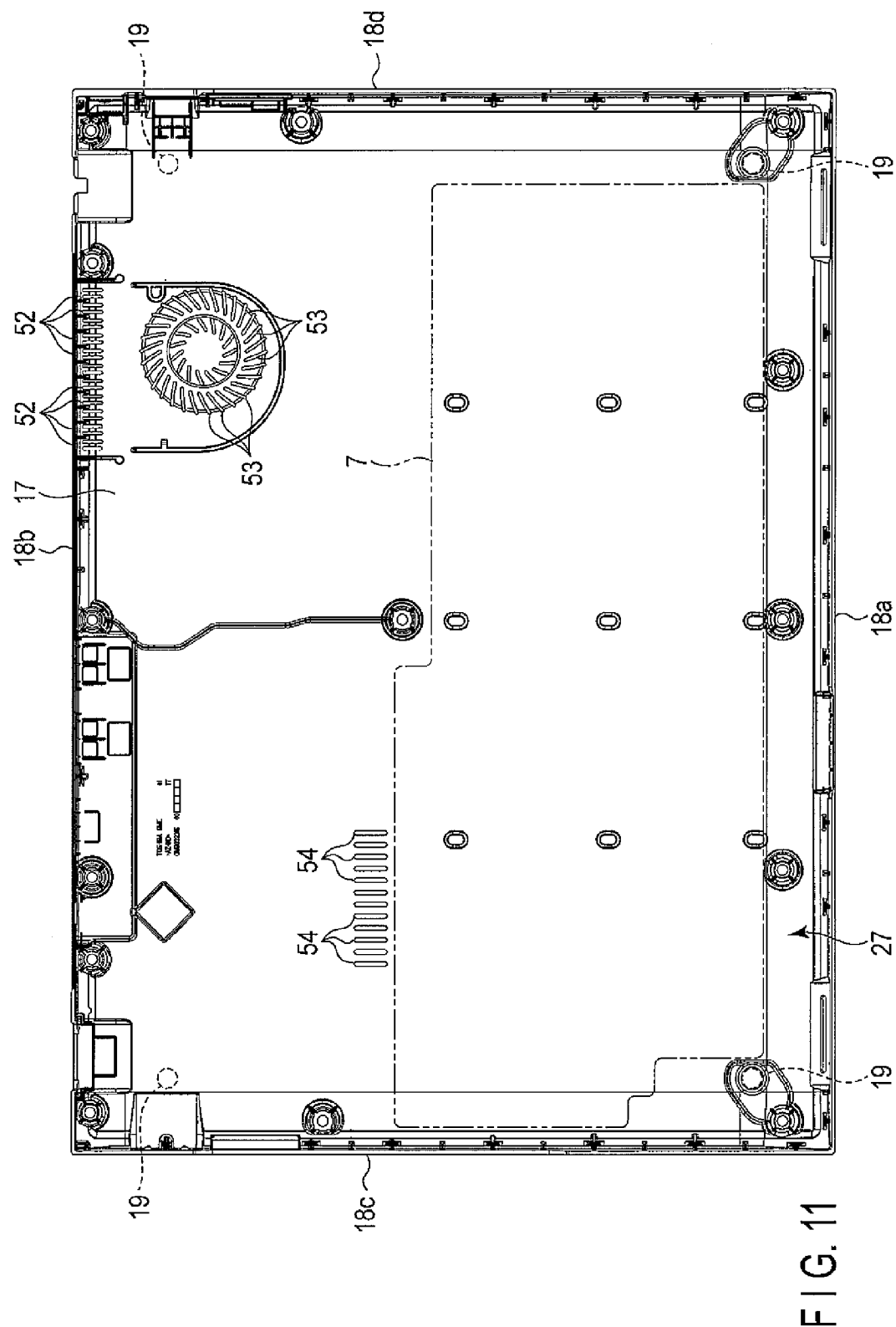
FIG. 11 is an exemplary plan view illustrating an inner surface of the lower cover shown in FIG. 5.

As shown in FIG. 11, first inlet holes 53 (i.e., openings) are formed on the lower wall 17 of the housing 4. The first inlet holes 53 face the fan 49. As shown in FIGS. 5 and 10, the fan 49 is a centrifugal fan and includes two inlet ports 49a and 49b provided separately on the upper and lower surfaces and a discharge port 49c provided on the side surface.

As shown in FIG. 10, the first inlet port 49a faces the first inlet port 49a on the lower wall 17 of the housing 4. The fan 49 sucks air from the outside of the housing 4 through the first inlet holes 53. As shown in FIG. 5, the second inlet port 49b is positioned on a side opposite to the first inlet port 49a and faces the upper wall 16 of the housing 4. The fan 49 sucks air from the inside of the housing 4 through the second inlet port 49b. The discharge port 49c faces the heat sink 50. The fan 49 blows air toward the heat sink 50.

As shown in FIG. 11, the housing 4 includes second inlet holes 54 (i.e., openings). The second inlet holes 54 are formed away from the battery unit 7 and face the circuit board 6. The fan 49 sucks air coming into the housing 4 from the second inlet holes 54 through the second inlet port 49b.

The heat pipe 51 is an example of a "heat conducting member." The heat pipe 51 extends between the heat-generating component 46 and the heat sink 50 and thermally connects the heat-generating component 46 and the heat sink 50.

As shown in FIG. 10, the battery unit 7 is attached between the circuit board 6 and the first end portion 21 of the housing 4. The battery unit 7 is an example of a "battery pack," a "battery," a "unit," and a "module."

The battery unit 7 has a rectangular shape. The longitudinal direction of the battery unit 7 is approximately the same as the longitudinal direction of the housing 4. The battery unit 7 extends approximately in parallel to the circuit board 6 and covers approximately the entire width of the housing 4, for example. As shown in FIG. 10, the battery unit 7 and the circuit board 6 are partly overlaid with each other in a direction crossing (for example, approximately perpendicular to)

the thickness direction of the housing 4. That is, the battery unit 7 and the circuit board 6 are partly overlaid with each other in a direction approximately parallel to the upper wall 16.

As shown in FIG. 10, the battery unit 7 is positioned between the circuit board 6 and the speakers 37 and 38. Moreover, the front end portion of the battery unit 7 is positioned between the first speaker 37 and the second speaker 38.

Next, the structure of the battery unit 7 will be described in detail.

Figure 12:
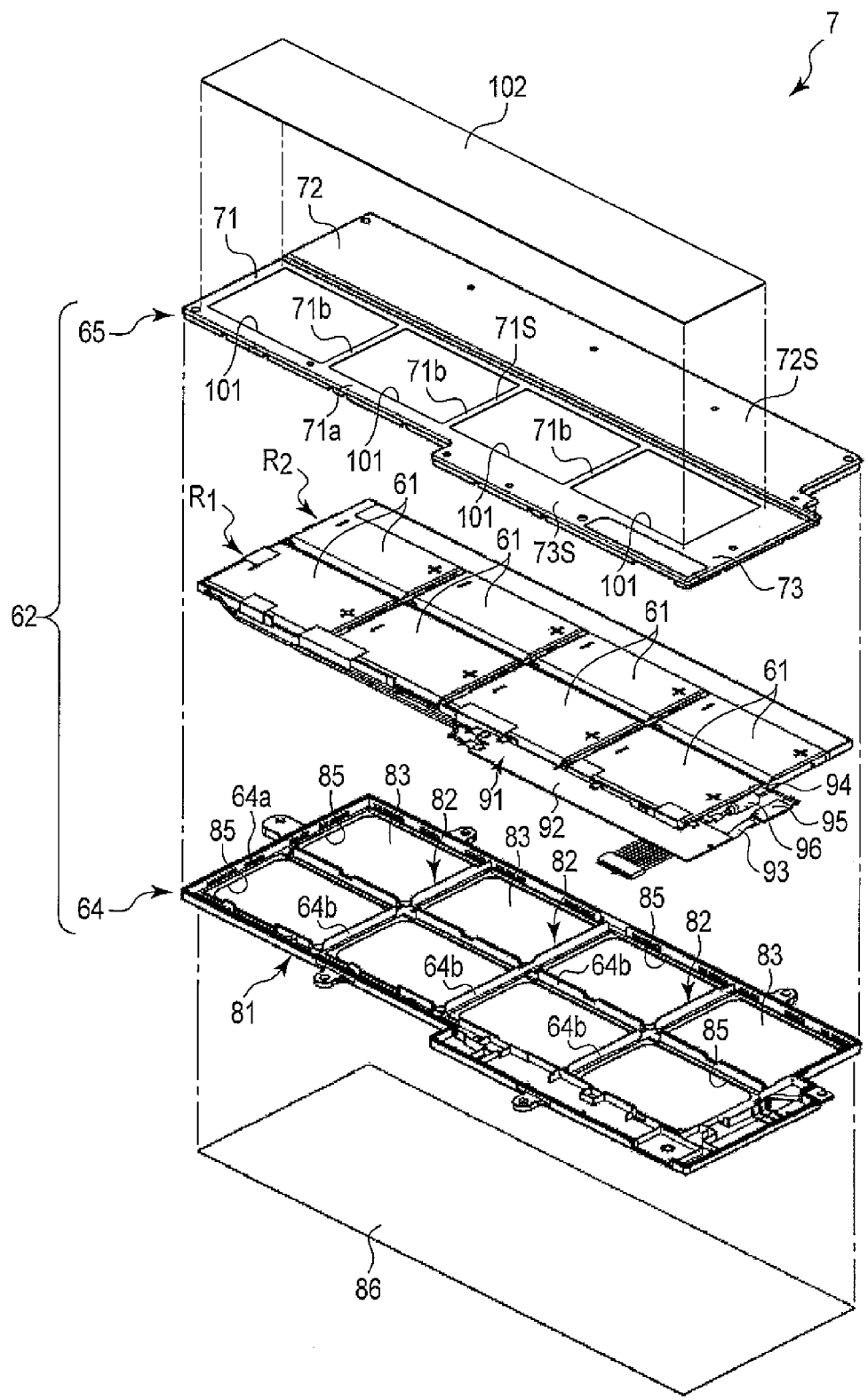
FIG. 12 is an exemplary exploded perspective view illustrating a battery unit shown in FIG. 9.
Figure 13:
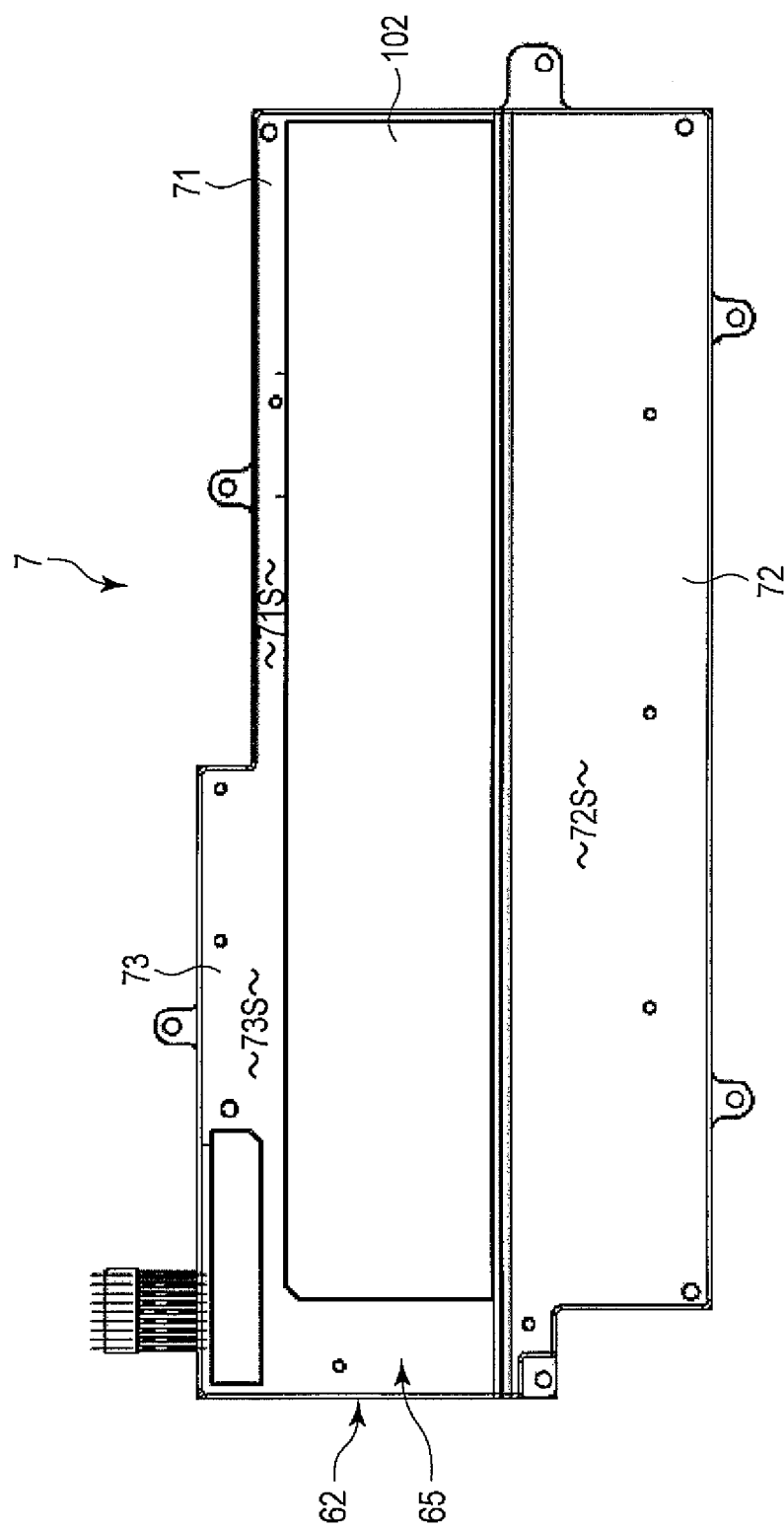
FIG. 13 is an exemplary plan view of the battery unit shown in FIG. 9.
Figure 14:
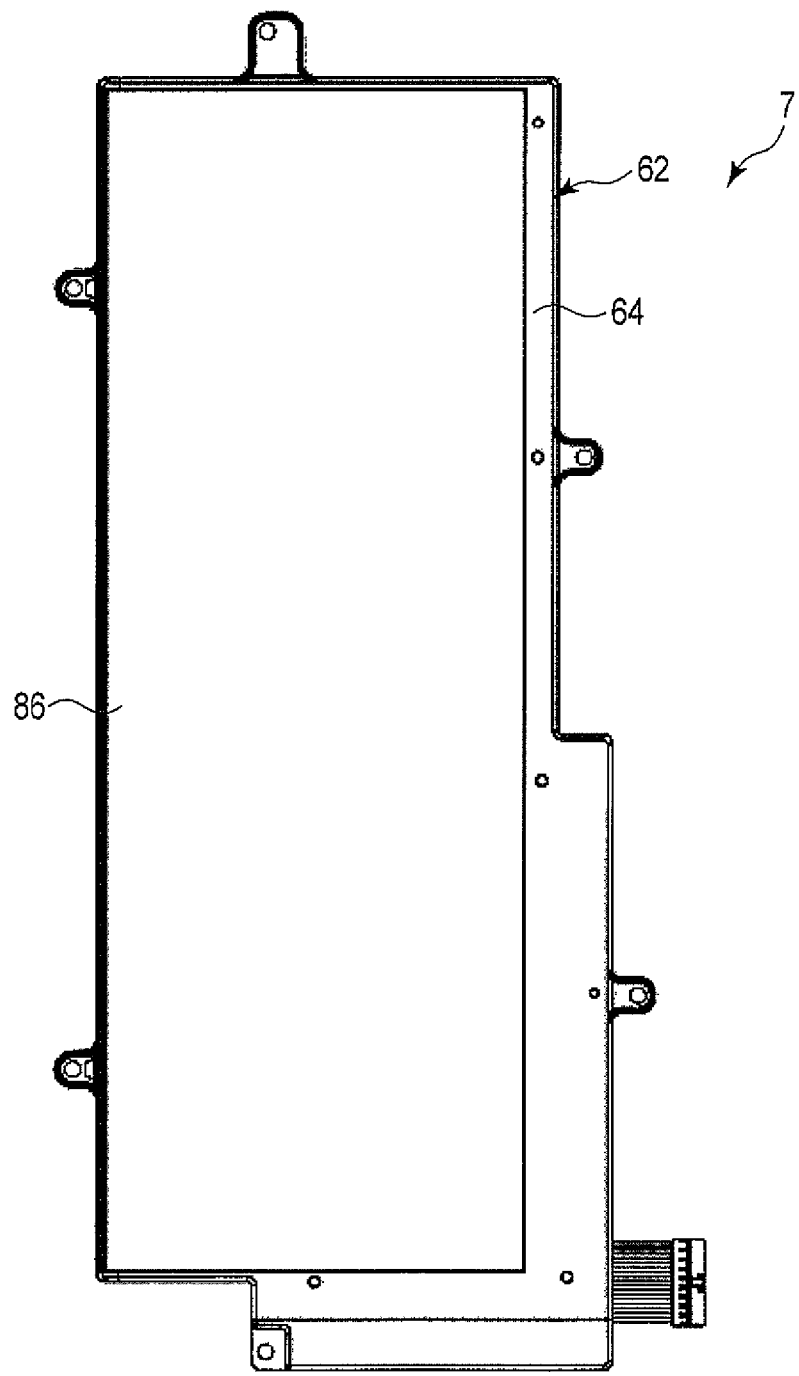
FIG. 14 is an exemplary bottom view of the battery unit shown in FIG. 9.
Figure 15:
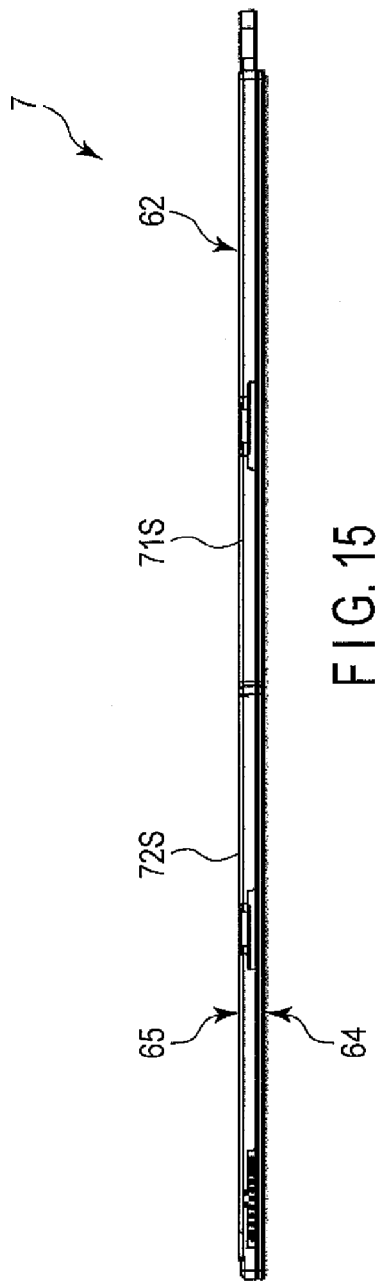
FIG. 15 is an exemplary side view of the battery unit shown in FIG. 9.
Figure 16:
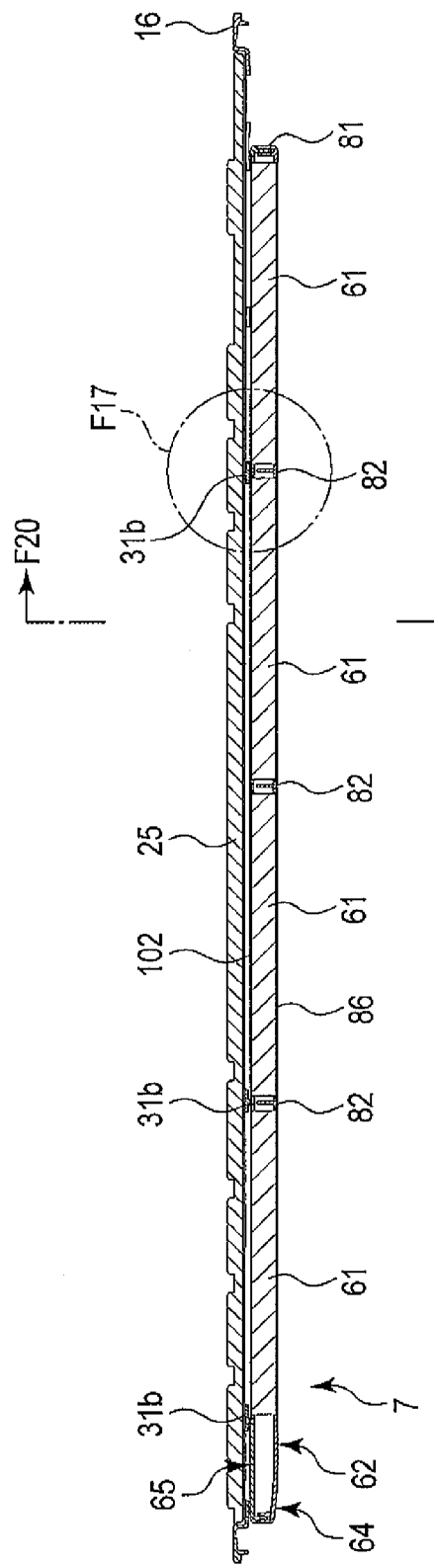
FIG. 16 is an exemplary cross-sectional view taken along the line F16-F16 of a keyboard and the battery unit shown in FIG. 5.

As shown in FIG. 12, the battery unit 7 includes a plurality of battery cells 61 (i.e., cells) and a case 62 (i.e., battery case). Eight battery cells 61 are provided, for example. The battery cell 61 has a rectangular plate shape. The longitudinal direction of the battery cell 61 is approximately identical to the longitudinal direction of the battery unit 7.

Eight battery cells 61 are arranged in two rows of four battery cells each. That is, the battery cells 61 include four battery cells 61 positioned in the first row R1 and four battery cells 61 positioned in the second row R2. In each row, the respective battery cells 61 are arranged in a line in the longitudinal direction thereof.

The battery cell 61 of the present embodiment has a plate shape and is relatively thin. The battery cell 61 includes a first surface 61a, a second surface 61b, and a third surface 61c (see FIG. 17). The first surface 61a is an upper surface, for example. The second surface 61b is positioned on a side opposite to the first surface 61a and is a lower surface, for example. The third surface 61c extends between the first surface 61a and the second surface 61b in a direction crossing (for example, approximately perpendicular to) the first surface 61a and the second surface 61b. The third surface 61c is a side surface, for example. The third surface 61c is smaller in area than the first surface 61a and the second surface 61b. Each of the corner portion C1 between the third surface 61c and the first surface 61a and the corner portion C2 between the third surface 61c and the second surface 61b have a circular arc-shaped roundness, for example.

As shown in FIG. 12, the plurality of battery cells 61 are arranged in a line in a direction crossing (for example, approximately perpendicular to) the thickness direction of the battery cell 61. That is, the battery cells 61 are arranged so that the third surfaces 61c thereof face each other.

As shown in FIG. 12, the case 62 includes a base 64 (i.e., main portion) and a cover 65 attached to (e.g., combined with) the base 64. The battery cells 61 are positioned between the base 64 and the cover 65.

The base 64 is formed in a skeletal structure including a frame and beams, for example, and is open to the upper and lower directions. Specifically, the base 64 includes a frame portion 64a and beam portions 64b. The frame portion 64a is a frame that integrally surrounds the plurality of battery cells 61 and is positioned on the outer side of the plurality of battery cells 61. The frame portion 64a forms the circumferential wall of the base 64. The frame portion 64a is a rib standing in the thickness direction of the battery cells 61 and faces the third surfaces 61c of the battery cells 61.

The beam portions 64b are provided in a lattice form in the inner side of the frame portion 64a and are positioned between the plurality of battery cells 61. The beam portion 64a is a rib standing in the thickness direction of the battery cells 61 and extends between the third surfaces 61c of the plurality of battery cells 61.

Figure 17:
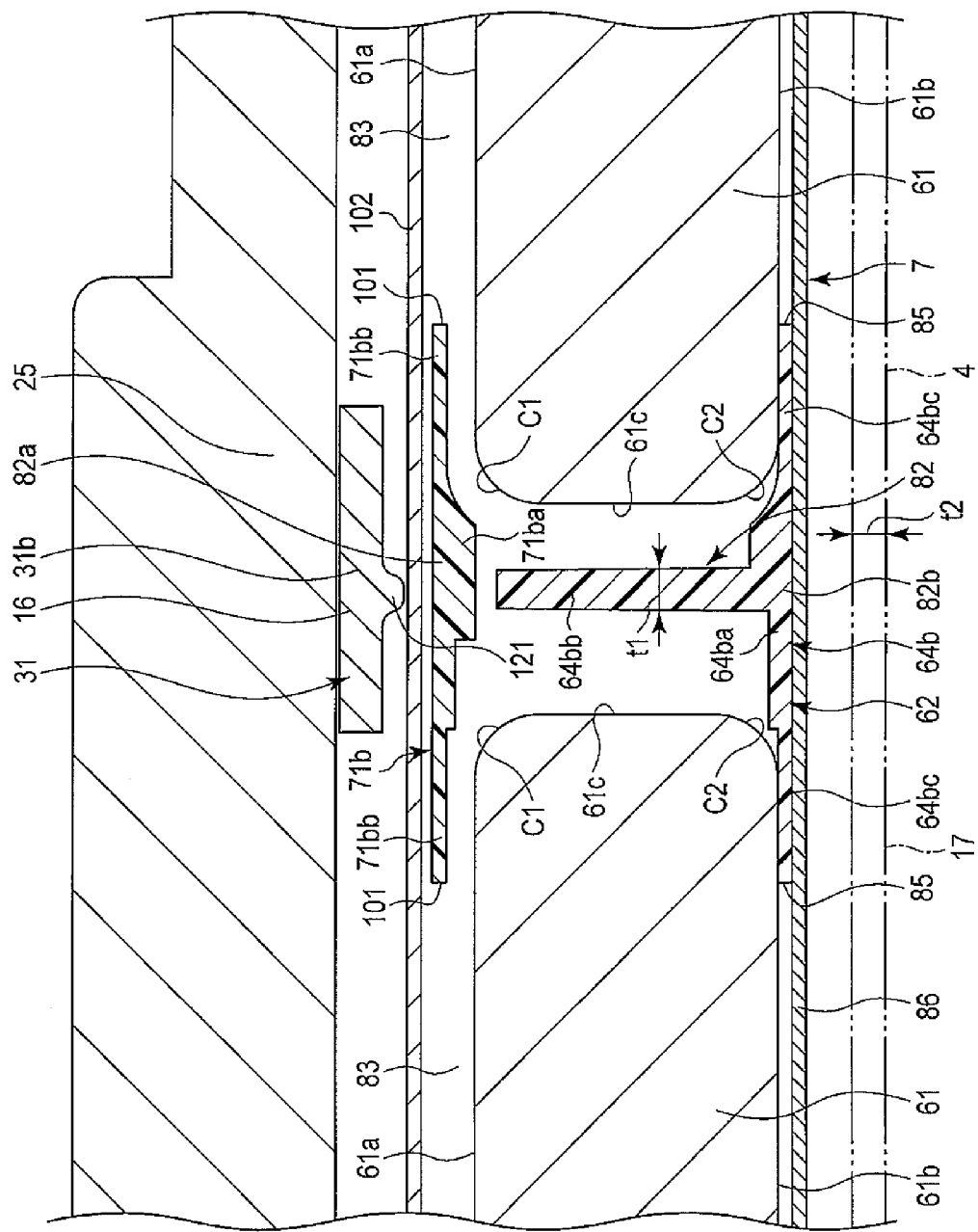
FIG. 17 is an exemplary enlarged cross-sectional view of a portion surrounded by the line F17 of the battery unit shown in FIG. 16.

FIG. 17 illustrates the details of the beam portion 64b. As shown in FIG. 17, the beam portion 64b includes a first portion 64ba, a second portion 64bb, and a third portion 64bc. The first portion 64ba extends approximately in parallel to the second surface 61b of the battery cell 61 and is inserted between the plurality of battery cells 61. A part of the first portion 64ba faces the third surface 61c of the battery cell 61. A part of the first portion 64ba faces the corner portion C2 of the battery cell 61 in a direction approximately parallel to the second surface 61b of the battery cell 61.

The second portion 64bb is a rib standing in the thickness direction of the battery cell 61 and extends along the third surface 61c of the battery cell 61. The second portion 64bb faces the third surface 61c of the battery cell 61. The second portion 64bb is provided over approximately the entire length of the beam portion 64b, for example. The second portion 64bb reinforces the beam portion 64b.

The third portion 64bc extends from an end portion of the first portion 64ba and faces the second surface 61b of the battery cell 61. The third portion 64bc is thinner than the first portion 64ba and has smaller strength than the first portion 64ba. The third portion 64bc regulates the vertical position of the battery cell 61, for example, and may substantially have no strength. The frame portion 64a has approximately the same configuration as the beam portion 64b.

On the other hand, as shown in FIG. 12, the cover 65 includes a first portion 71 having a skeletal structure and second and third portions 72 and 73 serving as a lid portion. The first portion 71 will be described herein, and the second and third portions 72 and 73 will be described later. The first portion 71 includes a frame portion 71a and beam portions 71b. The frame portion 71a is positioned so as to correspond to a part of the frame portion 64a of the base 64 and faces the frame portion 64a of the base 64. The frame portion 71a extends toward the base 64, for example, and is connected to the frame portion 64a of the base 64.

The beam portions 71b are positioned so as to correspond to the beam portions 64b of the base 64 and face the beam portions 64b of the base 64. As shown in FIG. 17, the beam portion 71b includes a first portion 71ba and a second portion 71bb. The first portion 71ba extends approximately in parallel to the first surface 61a of the battery cell 61 and is inserted between the plurality of battery cells 61. The first portion 71ba faces the second portion 64bb of the beam portion 64b of the base 64 in the thickness direction of the battery cell 61. A part of the first portion 71ba faces the third surface 61c of the battery cell 61. A part of the first portion 71ba faces the corner portion C1 of the battery cell 61 in a direction approximately parallel to the first surface 61a of the battery cell 61.

The second portion 71bb extends from an end portion of the first portion 71ba and faces the first surface 61a of the battery cell 61. The second portion 71bb is thinner than the first portion 71ba and has smaller strength than the first portion 71ba. The second portion 71bb may substantially have no strength. A gap is formed between the second portion 71bb and the battery cell 61.

Figure 18:
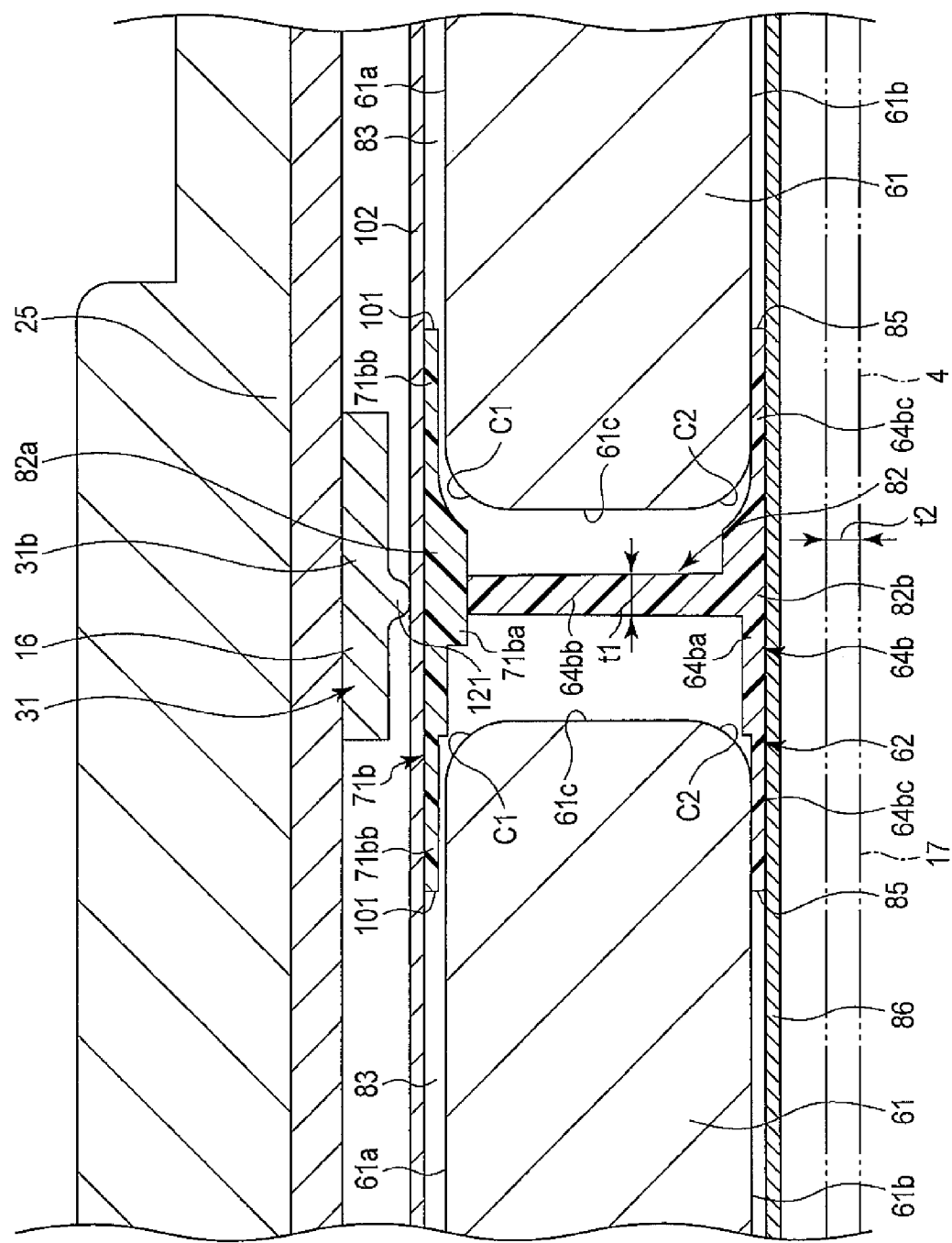
FIG. 18 is an exemplary cross-sectional view of the portion surrounded by the line F17 of the battery unit shown in FIG. 16.

FIG. 18 illustrates a state where external pressure is applied to the case 62. When external pressure is applied, the beam portion 71b of the cover 65 may be bent toward the beam portion 64b of the base 64. In this case, the beam portion 71b of the cover 65 comes into contact with the beam portion 64b of the base 64 so that the beam portion 71b is supported by the beam portion 64b of the base 64. In a state where the beam portion 71b of the cover 65 contacts with the beam portion 64b of the base 64, a gap is formed between the battery cell 61 and the second portion 71bb of the beam portion 71b of the cover 65. The second portion 71bb of the beam portion 71b of the cover 65 may slightly touch the battery cell 61.

With the base 64 and the cover 65, the case 62 includes a frame 81 and a plurality of beams 82. The frame 81 includes the frame portion 64a of the base 64 and the frame portion 71a of the cover 65. The beam 82 includes the beam portion 64b of the base 64 and the beam portion 71b of the cover 65. The beam 82 is an example of a "supporting portion." The case 62 is made of a plastic material, for example. The frame 81 and the plurality of beams 82 are integrally molded by a plastic material.

The frame 81 (i.e., first frame) forms the circumferential surface (i.e., circumferential wall) of the case 62 and surrounds the plurality of battery cells 61. The plurality of beams 82 are provided in a lattice form on the inner side of the frame 81. The plurality of beams 82 includes one beam 82 extending in the longitudinal direction of the battery unit 7 and three beams 82 extending in the lateral direction of the battery unit 7.

The respective beams 82 are positioned between the battery cell 61 and the battery cell 61 and face the third surfaces 61c of the battery cells 61. As a result, eight accommodation portions 83 (i.e., openings) partitioned by the beams 82 are provided in the inner side of the frame 81. The battery cells 61 are accommodated in the respective accommodation portions 83, respectively.

As shown in FIGS. 17 and 18, the beam 82 is thicker than the battery cell 61. That is, a part of the beam 82 is positioned closer to the inner surface of the housing 4 than the battery cells 61. Specifically, the beam 82 includes a first portion 82a and a second portion 82b. The first portion 82a is positioned closer to the upper wall 16 (e.g., the keyboard attachment portion 31) than the first surface 61a of the battery cell 61. The second portion 82b is positioned closer to the lower wall 17 than the second surface 61b of the battery cell 61. Similarly, the frame 81 is thicker than the battery cell 61.

As shown in FIG. 12, a first opening 85 is provided between the frame 81 and the beam 82. The first opening 85 is provided in the base 64. That is, the first opening 85 is provided between the frame portion 64a and the beam portion 64b of the base 64. The first opening 85 is formed in the respective accommodation portions 83. The first opening 85 faces the second surface 61b of the battery cell 61. The second surface 61b of the battery cell 61 is exposed to the outside through the first opening 85.

As shown in FIG. 12, a first sheet 86 (e.g., first label or first insulator) is attached to the lower surface of the case 62. The first sheet 86 is a paper, for example, and is thin. The first sheet 86 is flexible. The first sheet 86 is a non-rigid sheet which substantially has no strength (e.g., no rigidity).

The first sheet 86 is thinner than the thickness t1 of the beam 82, for example. The first sheet 86 is thinner than the thickness t2 of the housing 4, for example. The first sheet 86 has a size such that it covers approximately the entire area of the case 62 and integrally covers the plurality of accommodation portions 83 (i.e., the first openings 85). The first sheet 86 integrally covers the plurality of battery cells 61.

As shown in FIG. 12, the battery unit 7 includes a protection circuit 91 (circuit block). The protection circuit 91 includes a protection circuit board 92, a lead board 93, an insulating plate 94, a polymer switch 95, and a temperature fuse 96. The protection circuit 91 is not overlaid with the battery cell 61. The protection circuit 91 is provided outside the frame 81 and is electrically connected to the battery cell 61.

The protection circuit 91 is arranged in an L shape along the periphery of the frame 81. The case 62 includes a second frame 81 to which the protection circuit 91 is attached. The second frame 81 is connected to the frame 81 so as to reinforce the frame 81.

As shown in FIG. 12, the cover 65 is attached to the base 64 from a side opposite to the first sheet 86. As described above, the cover 65 includes the first portion 71, the second portion 72, and the third portion 73.

The first portion 71 corresponds to four battery cells 61 positioned in the first row R1, for example. A second opening 101 is provided in the first portion 71. The second opening 101 is provided between the frame 81 and the beam 82. That is, the second opening 101 is provided between the frame portion 71a and the beam portion 71b of the cover 65. The second opening 101 exposes at least one of the plurality of battery cells 61. The second opening 101 faces the first surface 61a of the battery cell 61. The first surface 61a of the battery cell 61 is exposed to the outside through the second opening 101.

As shown in FIG. 12, a second sheet 102 (e.g., second label or second insulator) is attached to the first portion 71 of the cover 65. The second sheet 102 is a paper, for example, and is thin. The second sheet is flexible. The second sheet 102 is a non-rigid sheet which substantially has no strength (e.g., no rigidity).

The second sheet 102 is thinner than the thickness t1 of the beam 82, for example. The second sheet 102 is thinner than the thickness t2 of the housing 4, for example. The second sheet 102 has a size such that it covers approximately the entire area of the case 62 and integrally covers the plurality of accommodation portions 83 (i.e., the second openings 101). The second sheet 102 integrally covers the plurality of battery cells 61.

As shown in FIG. 12, the second portion 72 faces at least another one of the plurality of battery cells 61. The second portion 72 corresponds to four battery cells 61 positioned in the second row R2, for example. The second portion 72 has a plate-like shape (i.e., lid shape or planar shape) and integrally covers the four battery cells 61. The second portion 72 is thicker than the first portion 71.

The second portion 72 has higher rigidity than the first portion 71 and reinforces the case 62. The second portion 72 extends in the longitudinal direction of the housing 4 (i.e., in the longitudinal direction of the circuit board 6). The second portion 72 contributes to suppression of bending in the longitudinal direction of the housing 4 (i.e., bending in the longitudinal direction of the circuit board 6).

As shown in FIGS. 7, 12, and 20, the second portion 72 bulges upward in relation to the first portion 71. That is, the surface 72S of the second portion 72 has a step in relation to the surface 71S of the first portion 71 and is positioned to be higher than the surface 71S of the first portion 71.

As shown in FIG. 12, the third portion 73 corresponds to the protection circuit 91 (i.e., corresponds to the second frame 81). The third portion 73 is attached to the second frame 81. The third portion 73 has a plate-like shape (i.e., lid shape or planar shape) and covers at least a part of the protection circuit 91. The third portion 73 is thicker than the first portion 71.

The third portion 73 has higher rigidity than the first portion 71 and reinforces the case 62. The third portion 73 extends in the longitudinal direction of the housing 4 (i.e., in the longitudinal direction of the circuit board 6). The third portion 73 contributes to suppression of bending in the longitudinal direction of the housing 4 (e.g., bending in the longitudinal direction of the circuit board 6). The second portion 72 and the third portion 73 are positioned separately on both sides of the first portion 71. As a result, the second portion 72 and the third portion 73 reinforce the first portion 71.

As shown in FIGS. 7, 12, and 20, the third portion 73 is provided away from the beam 82. A part of the third portion 73 is overlaid (i.e., faces) with the beam 82 in a direction crossing (for example, approximately perpendicular to) the thickness direction of the battery unit 7. The third portion 73 does not bulge in relation to the first portion 71. The surface 73S of the third portion 73 is positioned approximately on the same surface as the surface 71S of the first portion 71.

Figure 19:
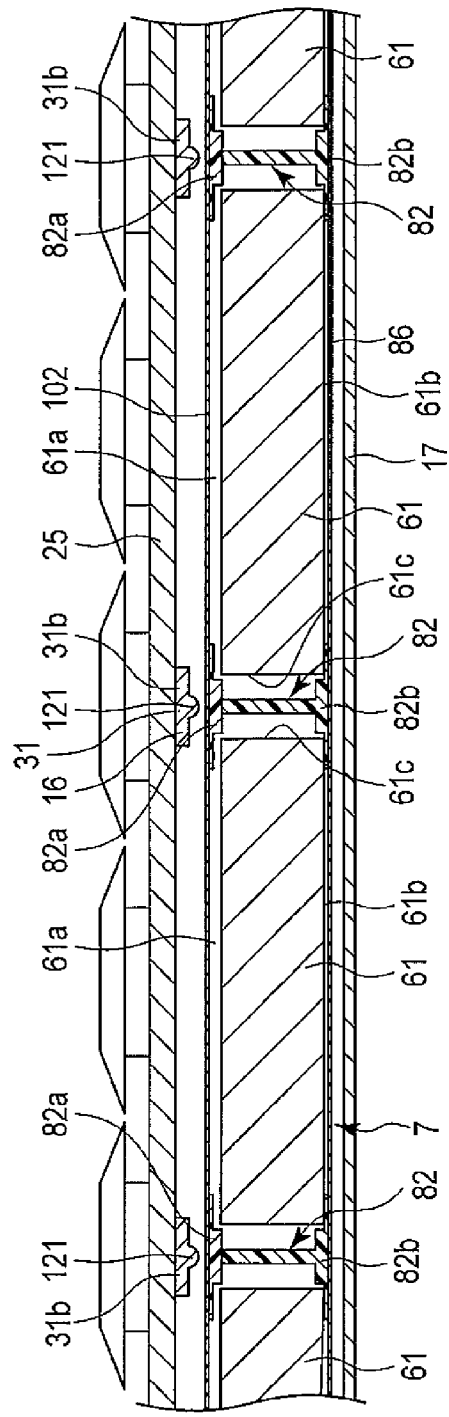
FIG. 19 is an exemplary cross-sectional view schematically illustrating the structure of the battery unit according to the second embodiment.
Figure 21:
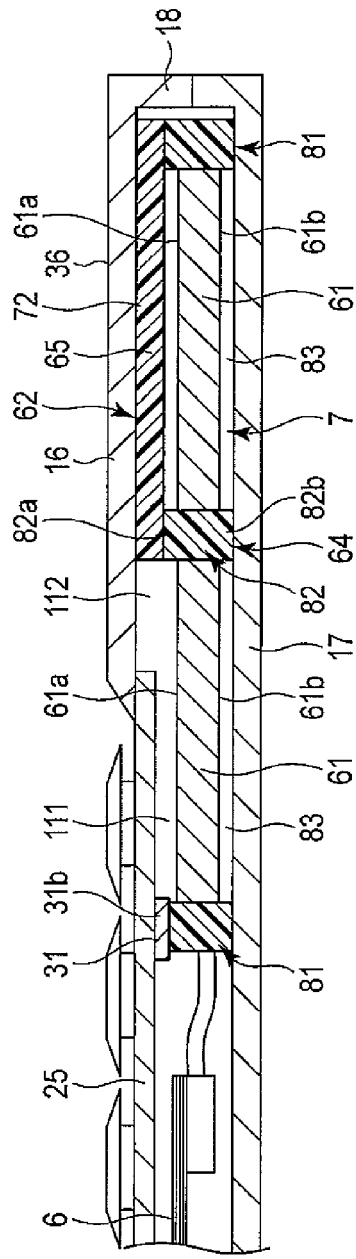
FIG. 21 is an exemplary cross-sectional view schematically illustrating the structure of the battery unit according to the second embodiment.

Next, the relation between the structure of the housing 4 and the battery unit 7 will be described. Here, FIGS. 19, 21, and 22 illustrate the structure schematically for the sake of convenience.

Figure 22:
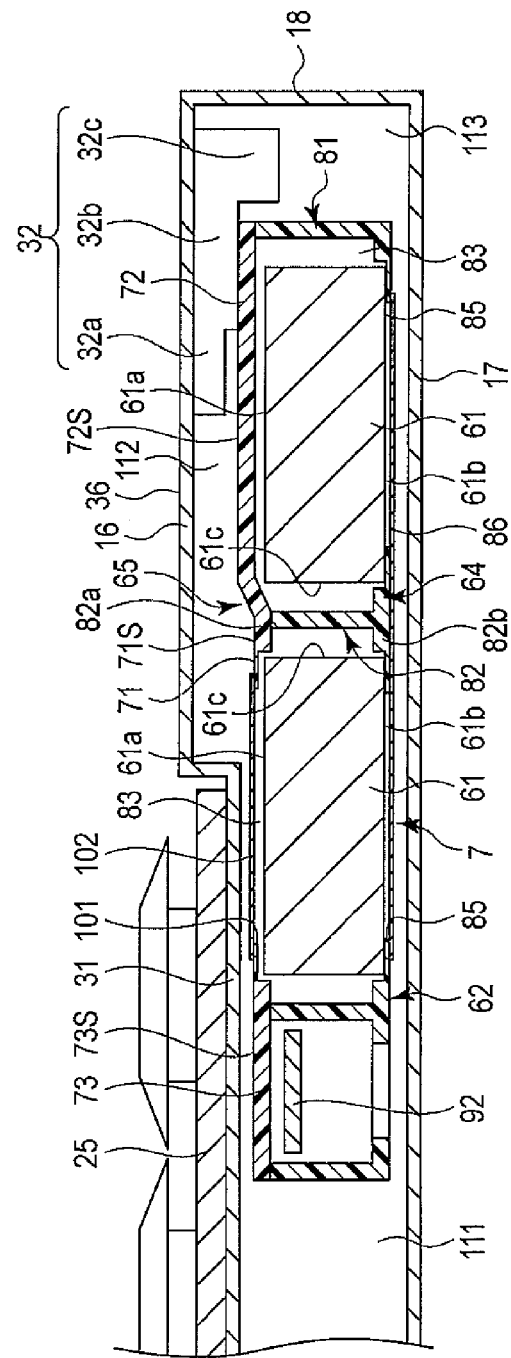
FIG. 22 is an exemplary cross-sectional view schematically illustrating the structure of the battery unit according to the second embodiment.

As shown in FIGS. 20 and 22, the housing 4 includes a first region 111, a second region 112, and a third region 113. The first region 111 (i.e., first portion) is a region in which the keyboard attachment portion 31 is provided. In the first region 111, the keyboard attachment portion 31 is depressed toward the inner side of the housing, and the inner thickness of the housing 4 is limited.

In the second region 112 (i.e., second portion), the palmrest 36 and the first and second portions 32a and 32b of the touch pad attachment portion 32 are provided. In the second region 112, the inner thickness of the housing 4 is larger than that of the first region 111. In the third region 113 (i.e., third portion), the third portion 32c of the touch pad attachment portion 32 is provided. In the third region 113, the inner thickness of the housing 4 is smaller than that of the first region 111.

As shown in FIGS. 20 and 22, the battery cells 61 positioned in the first row R1 are positioned in the first region 111. That is, the first portion 71 of the cover 65 is positioned in the first region 111 and positioned on the lower side of the keyboard attachment portion 31.

On the other hand, the battery cells 61 positioned in the second row R2 are positioned in the second region 112. That is, the second portion 72 of the cover 65 is positioned in the second region 112 having a sufficient space and is positioned on the lower side of the palmrest 36 and the first and second portion 32a and 32b of the touch pad attachment portion 32.

As shown in FIGS. 6 and 17 to 19, the upper wall 16 (e.g., the keyboard attachment portion 31) of the housing 4 includes first and second protrusions 121 and 122. The first and second protrusions 121 and 122 are provided on the inner surface of the housing 4 so as to protrude into the housing 4.

The first protrusion 121 protrudes toward the beam 82 of the battery unit 7. As shown in FIG. 6, the first protrusion 121 is a rib extending along the beam 82. When the upper wall 16 of the housing 4 is bent, the first protrusion 121 is supported by the beam 82. As a result, as shown in FIG. 18, bending of the upper wall 16 is suppressed before the upper wall 16 (e.g., the keyboard attachment portion 31) comes into contact with the battery cell 61.

As shown in FIG. 6, the second protrusion 122 extends in a direction crossing (for example, approximately perpendicular to) the first protrusion 121. The second protrusion 122 extends in the longitudinal direction of the housing 4, for example. The second protrusion 122 protrudes toward the frame 81 of the battery unit 7. When the upper wall 16 of the housing 4 is bent, the second protrusion 122 is supported by the frame 81. As a result, bending of the upper wall 16 is suppressed before the upper wall 16 (e.g., the keyboard attachment portion 31) comes into contact with the battery unit 7.

Next, the mounting structure of the present embodiment will be described.

As shown in FIG. 10, an end portion 131 (e.g., front end portion) of the battery unit 7 extends in the longitudinal direction of the housing 4 and covers approximately the entire width of the housing 4. The end portion 131 of the battery unit 7 extends in a direction along which the second sound radiation hole 42b of the first speaker 37 radiates sound. That is, the end portion 131 of the battery unit 7 extends in a direction from the second sound radiation hole 42b of the first speaker 37 to the second sound radiation hole 42b of the second speaker 38.

Moreover, the end portion 131 of the battery unit 7 extends in a direction along which the second sound radiation hole 42b of the second speaker 38 radiates sound. That is, the end portion 131 of the battery unit 7 extends in a direction from the second sound radiation hole 42b of the second speaker 38 to the second sound radiation hole 42b of the first speaker 37.

As a result, the sound radiated from the second sound radiation hole 42b of the first speaker 37 and the sound radiated from the second sound radiation hole 42b of the second speaker 38 are guided along the end portion 131 of the battery unit 7, collided with each other and enhanced inside the housing 4. That is, the battery unit 7 forms a part of a guide portion that guides the sound from the first and second speakers 37 and 38 inside the housing 4.

As shown in FIG. 11, an end portion 132 (e.g., rear end portion) of the battery unit 7 extends in the longitudinal direction of the housing 4 and covers approximately the entire width of the housing 4. As a result, by the end portion 132 of the battery unit 7, a wall extending in the longitudinal direction of the housing 4 is formed inside the housing 4. Air taken from the second inlet holes 54 is guided by the wall and flown toward the fan 49. That is, the battery unit 7 forms a part of a rectification portion that guides the flow of air inside the housing 4. That is, the end portion 132 of the battery unit 7 and the rear wall 18b of the housing 4 form a part of a duct that extends from the second inlet holes 54 toward the fan 49.

As shown in FIG. 11, the leg portions 19 formed on the lower wall 17 of the housing 4 are provided away from the battery unit 7. As a result, load is barely applied to the battery unit 7.

According to such a configuration, it is possible to decrease the thickness of the electronic apparatus 11.

A general battery case is integrally formed of a rigid plastic material. In such a configuration, the battery case needs to have some degree of thickness on the upper and lower sides of the battery cell 61, and the battery unit is relatively thick.

In the present embodiment, the battery unit 7 includes the beam 82 (i.e., supporting portion) which is positioned between the plurality of battery cells 61 and is thicker than the battery cell 61. According to such a configuration, stress applied from the outside of the battery unit 7 is received by the beam 82 and is rarely applied directly to the battery cell 61.

Therefore, even when the battery case 62 is not integrally formed of a rigid plastic material, it is possible to protect the battery cell 61. As a result, it is possible to decrease the thickness and weight of the battery unit 7 while maintaining mechanical strength. This leads to achievement of a decrease in thickness and weight of the electronic apparatus 11.

In the present embodiment, the battery unit 7 includes the case 62 including the accommodation portion 83, the battery cell 61 accommodated in the accommodation portion 83 and exposed through the opening 85, and the sheet 86 attached to the case 62 so as to cover the opening 85. According to such a configuration, a part of the case 62 can be formed of the thin and light sheet 86. As a result, it is possible to decrease the thickness and weight of the battery unit 7.

In the present embodiment, the battery unit 7 includes the frame 81 that surrounds the plurality of battery cells 61 and the beam 82 that is located between the plurality of battery cells 61. According to such a configuration, since a relatively strong protection structure protecting the battery cell 61 is formed by the frame 81 and the beam 82, a part of the case 62 can be formed of a member which has weaker strength and is thin and light. As a result, it is possible to decrease the thickness and weight of the battery unit 7.

In the present embodiment, the housing 4 includes the protrusion 121 that is provided on the inner surface of the housing 4 so as to protrude toward the beam 82. According to such a configuration, when force is applied to the housing 4 so that the housing 4 is bent, the protrusion 121 is reliably supported by the beam 82 before the inner surface of the housing 4 comes into contact with the battery cell 61. That is, impact and load from the housing 4 can reliably escape to the beam 82 of the case 62 through the protrusion 121. As a result, a part of the case 62 can be formed of a member which has further weaker strength and is thin and light, and it is possible to decrease the thickness and weight of the battery unit 7.

In the present embodiment, the protrusion 121 is a rib extending along the beam 82. According to such a configuration, the protrusion 121 is more reliably supported by the beam 82. As a result, a part of the case 62 can be formed of a member which has further weaker strength and is thin and light, and it is possible to decrease the thickness and weight of the battery unit 7.

In the present embodiment, the cover 65 includes the first portion 71 and the second portion 72. The second portion 72 is thicker than the first portion 71 and reinforces the case 62. According to such a configuration, it is possible to secure the strength of the case 62 more reliably. In particular, since the second portion 72 is provided, the strength of the case 62 against folding and twisting is improved.

The second portion 72 is provided on the lower side of the palmrest 36. According to such a configuration, the palmrest 36 is reinforced by the second portion 72. As a result, the palmrest 36 is rarely bent.

In the present embodiment, the cover 65 includes the third portion 73 which covers at least a part of the protection circuit 91 and is thicker than the first portion 71 and which reinforces the case 62. According to such a configuration, the strength of the case 62 against folding and twisting is improved further.

In the present embodiment, the second portion 72 and the third portion 73 of the cover 65 are positioned to be divided on both sides of the first portion 71 of the cover 65. According to such a configuration, the case 62 is further effectively reinforced by the second portion 72 and the third portion 73.

In the present embodiment, the frame 81 and the beams 82 are integrally molded by a plastic material. According to such a configuration, the manufacturing property, handling ability, manufacturing cost, and the like of the case 62 can be improved.

In the present embodiment, the plurality of battery cells 61 and the circuit board 6 partially are arranged with each other in the direction crossing the thickness direction of the housing 4. According to such a configuration, it is possible to further decrease the thickness of the housing 4. In the present embodiment, the second portion 72 of the cover 65 extends in the longitudinal direction of the circuit board 6. According to such a configuration, it is possible to reinforce the structure in the longitudinal direction of the circuit board 6.

The embodiments are not limited to the embodiments described above, but may be realized by modifying constituent elements in the implementing step within a range without departing from the spirit of the invention. Moreover, various embodiments can be made by appropriately combining a plurality of constituent elements disclosed in the embodiments described above. For example, some constituent elements may be removed from all constituent elements disclosed in the embodiments. Furthermore, constituent elements in different embodiments may be combined appropriately.

For example, the beam 82 may be provided in either the base 64 or the cover 65. The beams 82 (i.e., the supporting portions) may not be provided in the lattice form. A part of the frame 81 may not be provided. The second and third portions 72 and 73 of the case 62 are not essential elements.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a housing;
battery cells arranged in the housing;
a case comprising
a frame surrounding the battery cells,
a beam inside the frame and between the battery cells next to each other, a size of the beam in a thickness direction of the battery cells being greater than a thickness of at least one of the battery cells, the beam comprising a portion closer to an inner surface of the housing than at least one of the battery cells, and
a first opening between the frame and the beam, the first opening configured to expose at least one of the battery cells;
a first sheet on the case and covering the first opening;
a protrusion toward the portion of the beam, the protrusion being on the inner surface of the housing; and
a first circuit outside the frame and not on the battery cells, the first circuit configured to electrically connect to at least one of the battery cells.

2. The electronic apparatus of claim 1,
wherein the protrusion comprises a rib extending along the beam.

3. The electronic apparatus of claim 1,
further comprising a second sheet on the case,
wherein the first sheet and the second sheet are thinner than a thickness of the beam.

4. The electronic apparatus of claim 3,
wherein the case comprises
a base comprising the first opening and the first sheet, and
a cover on the base on a side opposite the first sheet, and
the cover comprises
a first portion comprising a second opening configured to expose at least one of the battery cells, the second sheet covering the second opening, and
a second portion facing at least another one of the battery cells, the second portion being thicker than the first portion.

5. The electronic apparatus of claim 4,
wherein the first circuit is along a periphery of the frame, and
the cover comprises a third portion covering at least a part of the first circuit, the third portion being thicker than the first portion.

6. The electronic apparatus of claim 5,
wherein the second and third portions are located separately on both sides of the first portion.

7. The electronic apparatus of claim 6,
further comprising a second circuit board,
wherein the second circuit board partly faces at least one of the battery cells in a direction crossing a thickness direction of the housing.

8. The electronic apparatus of claim 7,
wherein the second portion extends in a longitudinal direction of the second circuit board.

9. The electronic apparatus of claim 1,
wherein the frame and the beam are integrally molded and comprise a plastic material.

10. An electronic apparatus comprising:
a housing;
battery cells arranged in the housing;
a case comprising
　a beam between the battery cells next to each other, a size of the beam in a thickness direction of the battery cells being greater than at least one of the battery cells, the beam comprising a portion closer to an inner surface of the housing than at least one of the battery cells, and openings configured to expose at least one of the battery cells; and
a sheet configured to cover at least one of the openings.

11. An electronic apparatus comprising:
a housing;
battery cells arranged in the housing; and
a supporting portion between the battery cells next to each other in the housing, a size of the supporting portion in a thickness direction of the battery cells being greater than at least one of the battery cells, the supporting portion comprising a portion closer to an inner surface of the housing than at least one of the battery cells.

12. The electronic apparatus of claim 10,
wherein the case comprises a frame surrounding the battery cells, the beam being inside the frame.

13. The electronic apparatus of claim 10,
wherein the case comprises a base and a cover on the base, the battery cells being between the base and the cover, and
wherein the base comprises a first beam portion extending in the thickness direction of the battery cells between the battery cells next to each other, and the cover comprises a second beam portion facing the first beam portion, the beam comprising the first beam portion and the second beam portion.

14. The electronic apparatus of claim 13,
wherein the first beam portion comprises a first portion extending in an arrangement direction of the battery cells between the battery cells next to each other, a second portion protruding from the first portion in the thickness direction of the battery cells, and a third portion extending from the first portion in the arrangement direction of the battery cells and facing at least one of the battery cells, and
wherein the second beam portion comprises a fourth portion facing the first portion between the battery cells next to each other, and a fifth portion extending from the fourth portion in the arrangement direction of the battery cells and facing at least one of the battery cells.

15. The electronic apparatus of claim 14,
wherein at least one of the battery cells is between the third portion and the fifth portion.

16. The electronic apparatus of claim 10,
wherein the sheet is thinner than a thickness of the beam.

17. The electronic apparatus of claim 11,
wherein the housing comprises a first wall and a second wall spaced from the first wall, the battery cells and the supporting portion being between the first wall and the second wall.

18. The electronic apparatus of claim 17,
wherein the first wall comprises a projection toward the portion of the supporting portion.

\* \* \* \* \*